(12) United States Patent
Minafò et al.

(10) Patent No.: US 10,380,392 B2
(45) Date of Patent: Aug. 13, 2019

(54) VARIABLE ORIENTATION SCAN ENGINE

(71) Applicant: Datalogic IP Tech, S.r.l., Bologna (IT)

(72) Inventors: Giovanni Minafò, Cento (IT); Fabrizio Guastadini, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 15/182,336

(22) Filed: Jun. 14, 2016

(65) Prior Publication Data

US 2017/0357837 A1    Dec. 14, 2017

(51) Int. Cl.
*G06K 19/00* (2006.01)
*G06K 7/10* (2006.01)

(52) U.S. Cl.
CPC ..... *G06K 7/10732* (2013.01); *G06K 7/10831* (2013.01); *G06K 7/10881* (2013.01)

(58) Field of Classification Search
USPC ................................. 235/435, 439, 454, 462
See application file for complete search history.

(56) References Cited

U.S. PATENT DOCUMENTS

| | | | |
|---|---|---|---|
| 5,477,044 A * | 12/1995 | Aragon | G06K 7/10881 235/462.45 |
| 5,979,764 A | 11/1999 | Swyst et al. | |
| 6,003,773 A | 12/1999 | Durbin et al. | |
| 6,257,492 B1 | 7/2001 | Bressler et al. | |
| 6,631,845 B2 * | 10/2003 | Barkan | G06K 7/10574 235/462.14 |
| 7,322,526 B1 | 1/2008 | Koenck | |
| 7,845,559 B2 | 12/2010 | Kotlarsky et al. | |
| 7,857,218 B2 | 12/2010 | Nunnink | |
| 8,587,648 B2 | 11/2013 | Olsson et al. | |
| 2003/0098353 A1 | 5/2003 | Tsikos et al. | |
| 2010/0078479 A1 | 4/2010 | Epshteyn | |
| 2011/0163163 A1 * | 7/2011 | Rowe | G06K 9/00046 235/462.25 |
| 2011/0290889 A1 * | 12/2011 | Tamburrini | G06K 7/10881 235/470 |

(Continued)

FOREIGN PATENT DOCUMENTS

| EP | 1 112 522 B1 | 10/2003 |
|---|---|---|
| EP | 1 852 677 A2 | 11/2007 |

OTHER PUBLICATIONS

"DataMan 9500 Series Mobile Computer," Cognex, Dec. 12, 2015, retrieved from https://web.archive.org/web/20151212031428/http://www.cognex.com/products/barcode-readers-scanners/dataman-9500-handheld-barcode-reader-mobile-computer/ on Jun. 28, 2016, 2 pages.

(Continued)

*Primary Examiner* — Matthew Mikels
(74) *Attorney, Agent, or Firm* — Cozen O'Connor

(57) ABSTRACT

A machine readable symbol reader can include a variable orientation scan engine and features to vary the orientation of the scan engine with respect to a housing of the reader to maintain an orientation of the scan engine in a global sense while an orientation of the rest of the reader including the housing changes. Such a machine readable symbol reader can be used in machine-readable symbol readers such as laser scanning machine readable symbol readers, smartphones with barcode readers attached, barcode scanners, optical imaging scanners, cameras, mobile computers, or for machine vision generally.

20 Claims, 25 Drawing Sheets

(56) References Cited

U.S. PATENT DOCUMENTS

2013/0126617 A1* 5/2013 Olmstead ........... G06K 7/10732
                                                                  235/462.25
2015/0097035 A1* 4/2015 Duan ................. G06K 7/10831
                                                                  235/462.21
2015/0317503 A1* 11/2015 Powell ............... G06K 7/10831
                                                                  235/455

OTHER PUBLICATIONS

"MX-1000 Vision-enabled Mobile Terminal," Cognex, product shown publicly disclosed at least as early as May 2016, retrieved from http://www.cognex.com/products/barcode-readers-scanners/MX-1000-mobile-terminal/ on Jun. 28, 2016, 2 pages.

* cited by examiner

VARIABLE ORIENTATION SCAN ENGINE

BACKGROUND

Technical Field

The present disclosure relates to readers to read machine-readable symbols.

Description of the Related Art

Machine-readable symbols encode information in a form that can be optically read via an appropriately configured machine-readable symbol reader or scanner. Machine-readable symbols take a variety of forms, the most commonly recognized form being the linear or one-dimensional barcode symbol. Other forms include two-dimensional machine-readable symbols such as stacked code symbols, and area or matrix code symbols. These machine-readable symbols are typically composed of patterns of high and low reflectance areas. For instance, a barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, may include more than two colors (e.g., more than black and white), may comprise directly marked materials having the symbols formed in surface relief, and/or may comprise electronic media displayed by an illuminated screen or display of an electronic device such as a cell phone.

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), European Article Number (EAN), Code 39, Code 128, Data Matrix, PDF417, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a data reader to allow the customer to redeem a coupon or to verify that the customer has purchased a ticket for the event.

Machine-readable symbol readers or data readers are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relatively narrow beam or spot of light sequentially across the machine-readable symbol.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Reading a symbol typically employs generating an electrical signal having an amplitude determined by the intensity of the collected light. Relatively less reflective or darker regions (e.g., bars or other marks) may, for example, be characterized or represented in the electrical signal by an amplitude below a threshold amplitude, while relatively more reflective or lighter regions (e.g., white spaces) may be characterized or represented in the electrical signal by an amplitude above the threshold amplitude. When the machine-readable symbol is imaged, positive-going and negative-going transitions in the electrical signal occur, signifying transitions between darker regions and lighter regions. Techniques may be used for detecting edges of darker regions and lighter regions by detecting the transitions of the electrical signal. Techniques may also be used to determine the dimensions (e.g., width) of darker regions and lighter regions based on the relative location of the detected edges and decoding the information represented by the machine-readable symbol.

Many modern machine-readable symbol readers and data readers include electronic displays to provide information to an operator after scanning or reading a machine readable symbol. For example, after using a data reader to scan a ticket held by an airline passenger or a person attending a sporting or theater event, an operator may view a result of the scanning operation on an electronic display of the data reader to validate the ticket. In doing so, the operator may manipulate the data reader into a first configuration to scan the item and then manipulate the data reader into a second configuration to view the electronic display. Such operations can be cumbersome, uncomfortable, and inefficient, especially when repeatedly scanning a large number or items or symbols.

BRIEF SUMMARY

In some embodiments, a machine readable symbol reader comprises a housing including a handle to be held by an operator; a scan engine having a field of view that extends outward from the housing, the scan engine mounted to the housing so that the field of view is rotatable about an axis of rotation with respect to the housing; an accelerometer to output a signal that indicates an orientation of a component of the machine readable symbol reader with respect to gravity; and a controller responsive to the orientation indicated by the signal output by the accelerometer to control rotation of the field of view about the axis of rotation with respect to the housing based on the signal from the accelerometer to maintain the field of view at a constant orientation about the axis of rotation with respect to gravity as an orientation of the housing about the axis of rotation with respect to gravity changes.

The scan engine may include a photosensor array or an illumination source. The machine readable symbol reader may further comprise a coiled wire and a magnet positioned to interact with a magnetic field induced by a current that runs through the coiled wire to actuate the scan engine to rotate about the axis of rotation with respect to the housing. The machine readable symbol reader may further comprise a mirror, a coiled wire, and a magnet positioned to interact with a magnetic field induced by a current that runs through the coiled wire to actuate the mirror to rotate about the axis of rotation with respect to the housing. The machine readable symbol reader may further comprise a motor coupled to the housing and positioned to actuate the scan engine to rotate about the axis of rotation with respect to the housing. The machine readable symbol reader may further comprise a mirror and a motor coupled to the housing and positioned to actuate the mirror to rotate about the axis of rotation with respect to the housing.

The axis of rotation may extend substantially perpendicularly to the field of view. The axis of rotation may extend substantially perpendicularly with respect to gravity when the operator holds the machine readable symbol reader by the handle. The orientation of the component may be an orientation of the housing. The orientation of the component may be an orientation of the scan engine. The orientation of the component may be an orientation of a mirror.

In some embodiments, a machine readable symbol reader may comprise a housing including a handle to be held by an operator; a scan engine having a field of view that extends outward from the housing, the scan engine mounted to the housing to be rotatable about an axis of rotation with respect to the housing, wherein the axis of rotation extends substantially perpendicularly to the field of view; and a weight coupled to the scan engine to adjust an orientation of the scan engine about the axis of rotation with respect to the housing while an orientation of the housing about the axis of rotation with respect to gravity changes to maintain an orientation of the scan engine and of the field of view at a constant orientation about the axis of rotation with respect to gravity.

In some embodiments, a method of operating a machine readable symbol reader may comprise determining an operating orientation for a field of view of a scan engine of the machine readable symbol reader about an axis of rotation with respect to gravity; measuring an orientation of a component of the machine readable symbol reader with respect to gravity via an accelerometer; and adjusting an orientation of the field of view about the axis of rotation with respect to a housing of the machine readable symbol reader while an orientation of the housing about the axis of rotation with respect to gravity is changing to maintain the field of view at the operating orientation based at least in part on the measured orientation of the component with respect to gravity.

The axis of rotation may extend substantially perpendicularly to the field of view. The axis of rotation may extend substantially perpendicularly with respect to gravity. The component of the machine readable symbol reader may be the housing and using the measured orientation may include: using the measured orientation of the housing with respect to gravity and the operating orientation for the field of view to calculate an adjusted orientation of the scan engine about the axis of rotation with respect to the housing that leaves the field of view at the operating orientation; and adjusting the scan engine about the axis of rotation to the adjusted orientation about the axis of rotation with respect to the housing.

The component of the machine readable symbol reader may be the scan engine. Using the measured orientation of the component with respect to gravity to adjust the orientation of the field of view about the axis of rotation with respect to the housing may include using the measured orientation of the component with respect to gravity to adjust the orientation of the scan engine about the axis of rotation with respect to the housing. Using the measured orientation of the component with respect to gravity to adjust the orientation of the field of view about the axis of rotation with respect to the housing may include using the measured orientation of the component with respect to gravity to adjust the orientation of a mirror about the axis of rotation with respect to the housing.

In some embodiments, a machine readable symbol reader comprises: a housing including a handle to be held by an operator; a scan engine including a photosensor module having a first field of view and an illumination module having a second field of view that is rotatable with respect to the first field of view, the illumination module spaced apart from the photosensor module by a distance along a first axis; and a controller to control rotation of the illumination module about a second axis to adjust an angle of incidence of illumination from the illumination module on a machine readable symbol, the second axis perpendicular to the first axis and to the first field of view.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not limit the scope or meaning of the embodiments.

The technologies described herein can be used in machine-readable symbol readers such as laser scanning machine readable symbol readers, smartphones with barcode readers attached, barcode scanners, optical imaging scanners, cameras, mobile computers, or for machine vision generally. These technologies can include features to vary the orientation of a scan engine of a machine readable symbol reader with respect to a housing of the reader to maintain an orientation of the scan engine in a global sense while an orientation of the rest of the reader changes.

Figure 1:
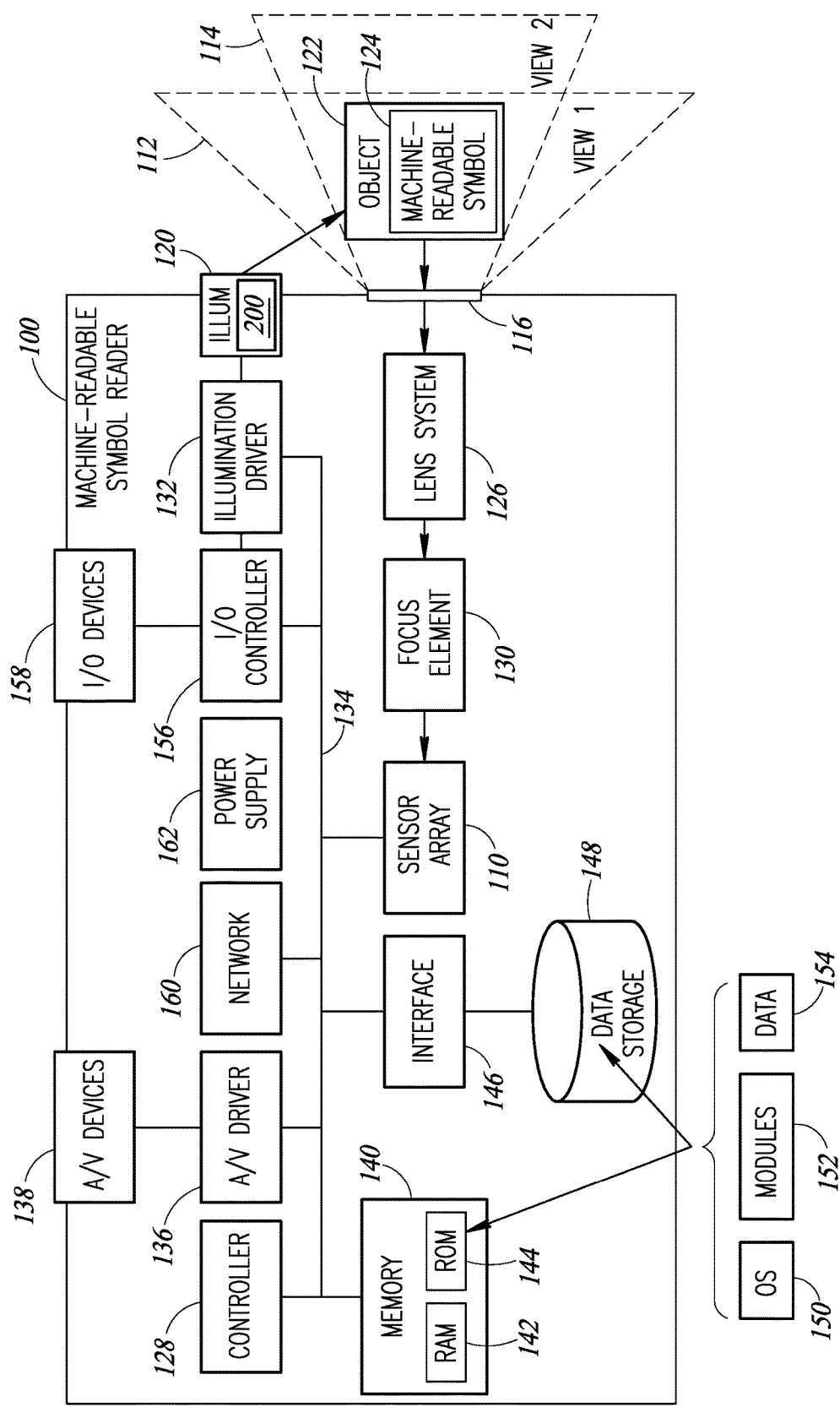
FIG. 1 is a block diagram of a machine-readable symbol reader and an object bearing a machine-readable symbol to be read, according to at least one illustrated embodiment.

FIG. 1 is a block diagram of a machine-readable symbol reader 100, according to one implementation. The machine-readable symbol reader 100 includes an image sensor or sensor array 110, which can capture images of fields of view such as fields of view 112 or 114 through a window 116. The fields of view 112 and 114 can be focused onto the sensor array 110. Image frames captured by the sensor array 110 may include light emanating from one of the fields of view 112 or 114. FIG. 1 also illustrates an item or object 122 positioned within the fields of view 112 and 114. The object 122 includes a machine-readable symbol 124 (e.g., PDF417, Code 128, etc.) that is to be detected and/or decoded by the machine-readable symbol reader 100.

The machine-readable symbol reader 100 includes a lens system 126 positioned and oriented to focus light onto the sensor array 110. For example, the lens system 126 may comprise an array of optical elements with a common axis. The lens system 126 may also comprise a zoom lens coupled to a controller 128 to control an amount of optical zoom. In some implementations, a 20×-40× amount of optical zoom is provided.

The machine-readable symbol reader 100 also includes a focal element 130 disposed between the lens system 126 and the sensor array 110 such that at least some of the light rays arrive at the sensor array 110 through the focal element 130. The focal element 130 operates to provide one or more image focus distances for light rays that strike the sensor array 110. For example, in some implementations the focal element 130 is a thin plate of optical glass having a relatively high index of refraction $n_d$ (e.g., $n_d$ between 1.3 to 3.0) positioned over the sensor array 110.

The sensor array 110 forms an electronic image of the field of view 112 or 114. The sensor array 110 may comprise a wide range of image sensing devices for converting an optical image (or another wavelength in the electromagnetic spectrum) into an electrical signal. For example, the sensor array 110 may comprise a digital sensor, such as a charge-coupled device (CCD) sensor array or complementary metal-oxide semiconductor (CMOS) sensor array, both of which form a one-dimensional or two-dimensional array of pixels, which together constitute an electronic representation of the image. Each pixel location stores data indicative of the light intensity at that location of the image. The light intensity data for each pixel may represent a color (e.g., red-green-blue) or monochrome intensity (e.g., grayscale). After the sensor array 110 has been exposed to light emanating from fields of view 112, 114, data from all the pixels can be sequentially read out in a selectable pattern (which may be row-by-row, sub-region by sub-region, or some other pattern). The pixel intensity data may optionally be converted to digital form using an analog-to-digital converter.

In response to receiving an instruction from a controller 128, the sensor array 110 captures or acquires one or more images of the field of view 112 or 114. Conceptually, a read volume of the reader 100 includes a portion of space in front of the window 116 in which machine-readable symbols may be read (e.g., detected and decoded) by the machine-readable symbol reader 100. In other words, the read volume may be referred to as a view volume within which there is a relatively high probability of a successful scan/read.

The machine-readable symbol reader 100 includes an illumination source 120, which is configured to illuminate the fields of view 112 and 114. The illumination source 120 can comprise any suitable source of light, such as one or more light emitting diodes (LEDs), flash strobes, incandescent or fluorescent lamps, or halogen bulbs. The illumination source 120 may generate light having one or more wavelengths. The illumination source 120 can also comprise an optical element 200 through which illumination generated by the source of light passes prior to passing out of the reader 100.

One or more illumination drivers or controllers 132 are provided. The illumination driver 132 is configured to apply signals to the illumination source 120 to, for example, strobe the illumination source 120 at desired times or to light the illumination source 120 constantly for a period of time. The illumination source 120 can be mounted within a housing of the machine-readable symbol reader 100 (e.g., behind window 116).

The sensor array 110 and the illumination driver 132 are communicatively coupled to the controller 128, which may be, for example, one or more of a processor, microprocessor, controller, microcontroller, digital signal processor (DSP), graphical processing unit (GPU) or the like (generally "processor"). Some implementations may include a dedicated machine-readable symbol scan module as the controller 128. The communicative coupling may be via a bus 134 or other communication mechanism, such as direct connections of a serial, parallel, or other type. The controller 128 generally controls and coordinates the operation of other devices to which it is connected, such as one or more of the sensor array 110, the illumination driver 132, and an audio/visual (A/V) driver 136. The A/V driver 136 is optionally included to drive one or more audio devices 138, such as a buzzer, speaker, or other audible indicator, to produce an audible "beep" or other indication when a machine-readable symbol is successfully read. In addition, or alternatively, the A/V driver 136 may drive an LED or other visual indicator device 138 when a machine-readable symbol has been successfully read. Other devices or subsystems, such as a cash register or electronic scale, may also be connected to the controller 128. Moreover, the controller 128 and/or the bus 134 may interface with other controllers or computers, such as a cash register system or checkout terminal. Some implementations can include a user operable trigger or other switch, operation of which can cause the machine-readable symbol reader 100 to read machine-readable symbols.

The machine-readable symbol reader 100 also includes one or more non-transitory media, for example, memory 140, which may be implemented using one or more standard memory devices. The memory devices 140 may include, for instance, flash memory, RAM 142, ROM 144, and EEPROM devices, and the non-transitory media may also include magnetic or optical storage devices, such as hard disk drives, CD-ROM drives, and DVD-ROM drives. The machine-readable symbol reader 100 may also include an interface 146 coupled to an internal data storage 148, such as a hard disk drive, flash memory, an optical disk drive, or another memory or drive. The interface 146 may be configured for external drive implementations, such as over a USB or IEEE 1194 connection.

According to one implementation, any number of program modules are stored in the drives (e.g., data storage 148) and the memory 140, including an operating system (OS) 150, one or more application programs or modules 152, such as instructions to implement the methods described herein, and data 154. Any suitable operating system 150 may be employed. One of the program modules 152 may comprise a set of instructions to implement the methods for generating image data using the data reader 100. The data 154 may include one or more configuration settings or parameters, or may include image data from the sensor array 110 and decoded machine-readable symbol data.

The machine-readable symbol reader 100 may include a number of other components that interface with one another via the bus 134, including an input/output (I/O) controller 156 and one or more I/O devices 158, and a network interface 160. For example, the I/O controller 156 may implement a display controller and the I/O devices 158 may include a display device to present data, menus, and prompts, and otherwise communicate with the user via one or more display devices, such as a transmissive or reflective liquid crystal display (LCD) or other suitable display. For example, the I/O controller 156 and I/O device 158 may be operable to display a navigable menu system or graphical user interface (GUI) that allows the user to select the illumination and image capture settings.

The I/O controller 156 may receive user input from one or more input devices, such as a keyboard, a pointing device, or other wired/wireless input devices, that allow the user to, for example, configure the machine-readable symbol reader 100. Other input devices may be included, such as a microphone, touchscreen, touchpad, and trackball. While the input devices may be integrated into the machine-readable symbol reader 100 and coupled to the controller 128 via the I/O controller 156, input devices may also connect via other interfaces, such as a connector that includes one or more data interfaces, bus interfaces, wired or wireless network adapters, or modems for transmitting and receiving data. Accordingly, the I/O controller 156 may include one or more of hardware, software, and firmware to implement one or more protocols, such as stacked protocols along with corresponding layers. Thus, the I/O connector 156 may function as one or more of a serial port (e.g., RS232), a Universal Serial Bus (USB) port, or an IR interface. The I/O controller 156 may also support various wired, wireless, optical, and other communication standards.

The network interface 160 may optionally be provided to communicate with one or more hosts or other devices (e.g., a computer, a point-of-sale terminal, a point-of-sale computer system, or a cash register). For example, data gathered by or decoded by the machine-readable symbol reader 100 may be passed along to a host computer. According to one implementation, the network interface 160 comprises a universal interface driver application-specific integrated circuit (UIDA). The network interface 160 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), or USB. A wireless connection may use low- or high-powered electromagnetic waves to transmit data using any wireless protocol, such as Bluetooth™, IEEE 802.11b (or other Wi-Fi standards), infrared data association (IrDA), and radiofrequency identification (RFID).

The machine-readable symbol reader 100 may also include one or more power supplies 162, which provide electrical power to the various components of the machine-readable symbol reader 100 via power connections.

Machine-readable symbol readers according to other implementations may have less than all of these components, may contain other components, or both. For example, the machine-readable symbol reader 100 may comprise a fixed scanner, such as an on-counter scanner or in-counter scanner, or a portable scanner, such as a handheld scanner. In addition, the machine-readable symbol reader 100 may include a radiofrequency identification (RFID) reader or interrogator and/or or a magnetic stripe reader. Such may be particularly useful when employed as a point-of-sale (POS) terminal.

After the sensor array 110 has been exposed to light reflected or otherwise returned by the object 122, data from all or a portion of the pixels can be sequentially read out in a selectable pattern (which may be row-by-row, column-by-column, or some other pattern). The pixel intensity data may optionally be converted to digital form using an analog-to-digital converter (ADC) circuit before being supplied to the controller 128. The controller 128 may include or comprise a DSP, for example, a DSP architecture such as the Blackfin® processor family from Analog Devices, Norwood, Mass., or a microcontroller, such as the high-speed ARM® processor family from ARM Ltd., Cambridge, United Kingdom. Briefly stated, the controller 128 processes the image data so as to attempt to decode a machine-readable symbol that has been focused onto the sensor array 110. The controller 128 may condition the data received from the sensor array 110 and may generate an output that generally identifies which regions of the image correspond to highly reflective or light areas, and which correspond to less reflective or dark areas, for example.

Figure 2:
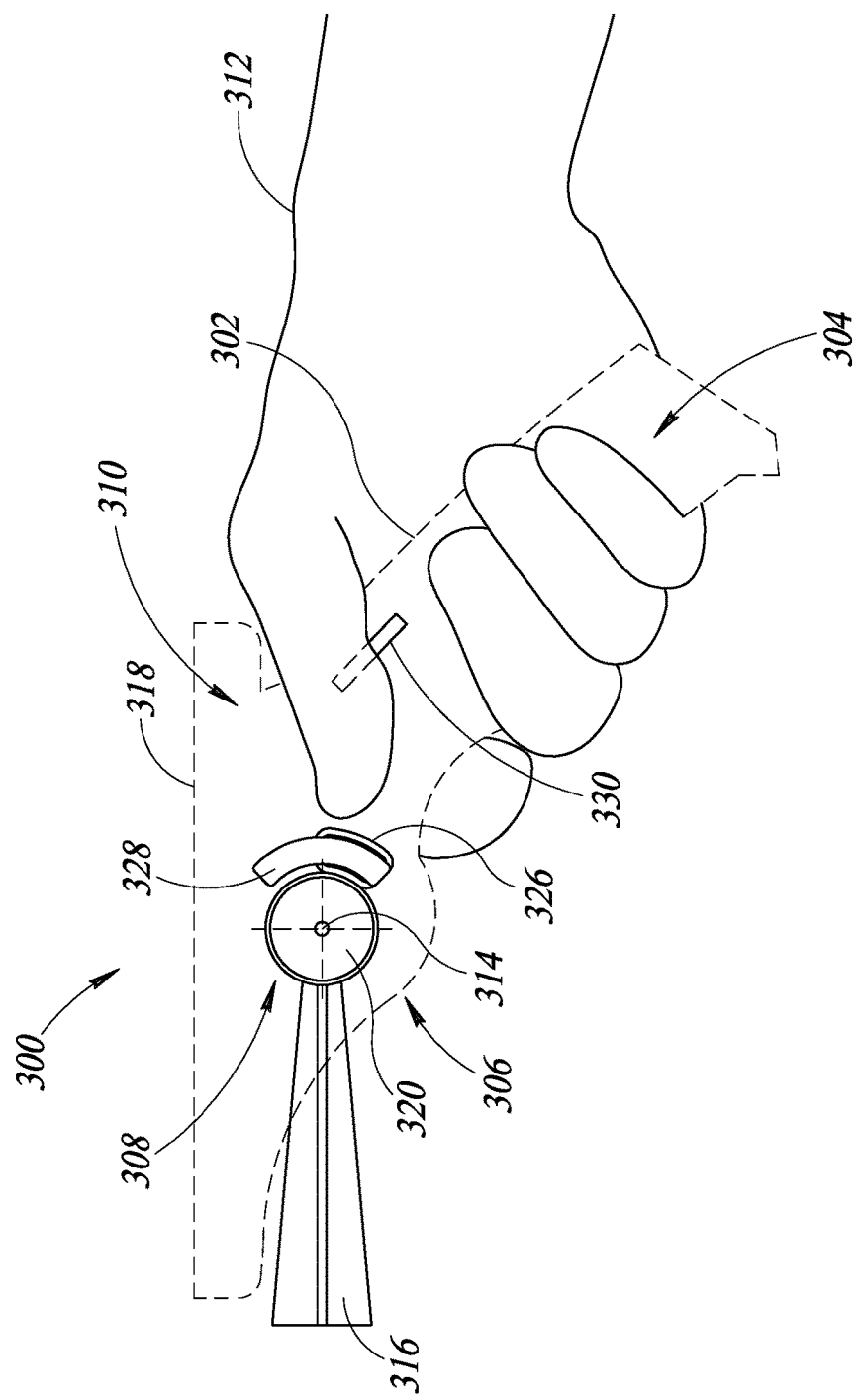
FIG. 2 is a diagram of a machine readable symbol reader having a first variable orientation scan engine in a first orientation with respect to a housing of the reader, according to at least one illustrated embodiment.
Figure 3:
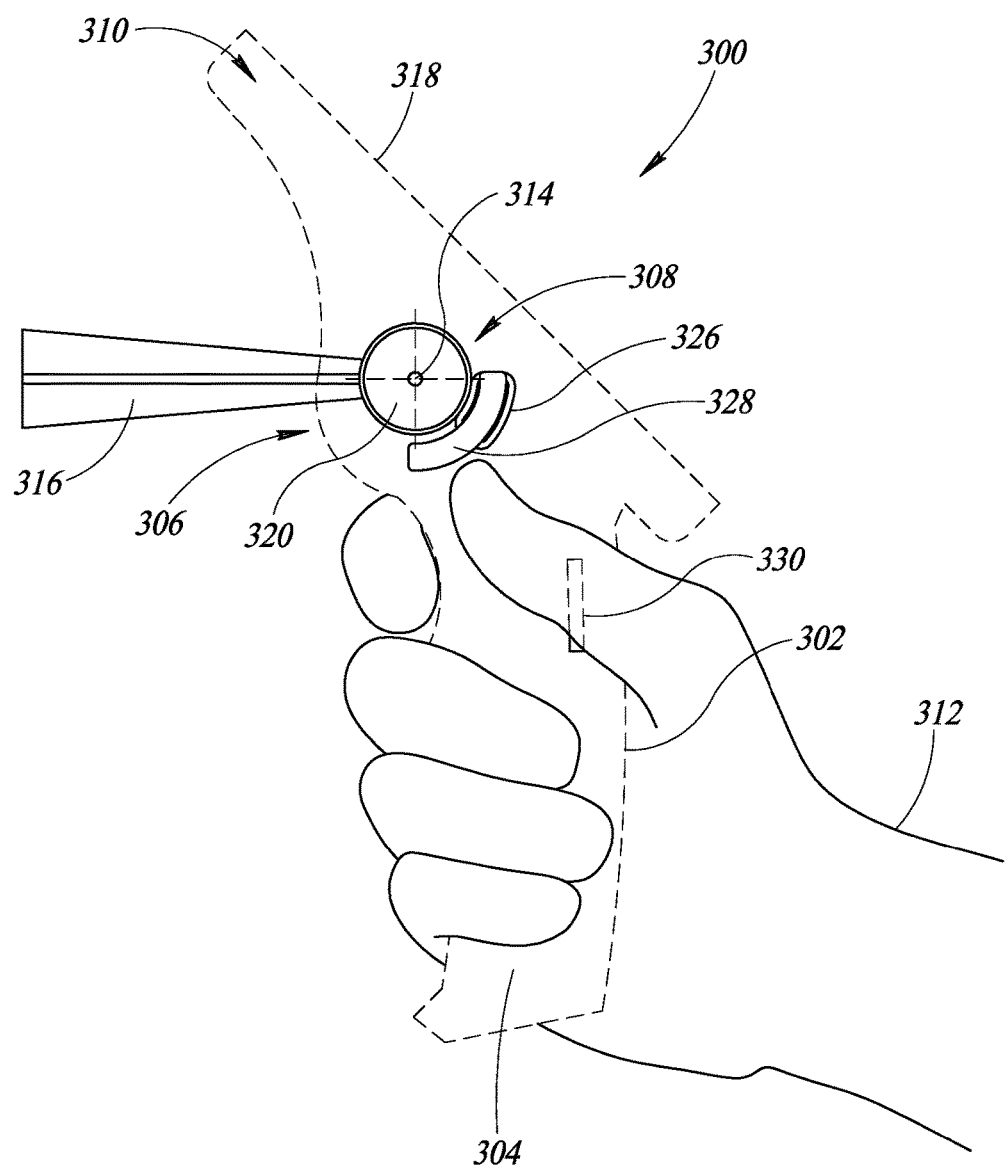
FIG. 3 is another diagram of the machine readable symbol reader of FIG. 2 having the first variable orientation scan engine in a second orientation with respect to the housing, according to at least one illustrated embodiment.

FIGS. 2-3 illustrate an outline of a first machine readable symbol reader 300, comprising an outer enclosure or housing 302 that includes a lower handle portion 304 to be held by an operator 312 of the reader 300, a central main body portion 306 housing a first variable orientation scan engine 308, and an upper display portion 310 that houses an electronic display that faces upward away from the upper display portion 310. The scan engine 308 can be mounted within the reader 300 to be rotatable with respect to the housing 302 about an axis of rotation 314, which extends from side to side or left to right between two opposed sidewalls of the housing 302 from the perspective of the operator 312 when using the reader 300. In ordinary operation of the reader 300, the axis of rotation 314 is level with the ground or perpendicular to gravity.

In particular, the scan engine 308 can be mounted within the reader 300 such that as the operator 312 moves the reader 300 and changes an orientation of the housing 302 with respect to the axis of rotation 314, an orientation of the scan engine 308 with respect to the axis of rotation 314 remains constant or substantially constant. Thus, the variable orientation scan engine 308 can maintain a constant orientation in a global sense by having a variable orientation with respect to the housing 302.

The reader 300 can include any combination of the features of the reader 100 described above, and the scan engine 308 can include a sensor array such as sensor array 110, a focus element such as focus element 130, a lens system such as lens system 126, a window such as window 116, and an illumination source such as illumination source 120. Thus, the reader 300 and scan engine 308 can perform in the manner described above for reader 100, and can be operated to illuminate and read machine readable symbols within a scan aperture or field of view 316 (referring herein to a region that can be illuminated and/or scanned by the scan engine 308) that projects forward out of the front of the reader 300.

FIG. 2 shows that the operator 312 can hold the reader 300 in a hand with an outstretched arm, so that the field of view 316 projects outwardly from the front of the reader 300 along an axis coincident with, parallel to, or substantially coincident with or parallel to a central longitudinal axis of the operator's forearm 312. As used herein, the axis along which a field of view projects is the center-most axis of the field of view. FIG. 2 also shows that the operator 312 can hold the reader 300 so that the axis along which the field of view 316 projects and the central longitudinal axis of the operator's arm 312 are parallel or substantially parallel to an upper surface 318 of the electronic display and of the upper display portion 310 of the housing 302. Thus, the reader 300 can be used by the operator 312 in a standard point-and-shoot manner such that these axes and planes are also coincident with, parallel to, or substantially coincident with or parallel to the operator's line of sight, as well as perpendicular or substantially perpendicular to the axis of rotation 314, and in some cases perpendicular or substantially perpendicular to gravity.

FIG. 3 shows that when the operator 312 wants to view the electronic display in the upper display portion 310 of the reader 300, the operator 312 may manipulate the reader 300 to rotate the housing 302 to obtain a better viewing angle for the display at the top of the reader 300. If the scan engine 308 of the reader 300 were rigidly fixed to the housing 302, then the operator 312 may not be able to use the reader 300 in the convenient point-and-shot orientation while maintaining the electronic display of the reader 300 at a convenient viewing angle, and the operator may instead have to repeatedly alternate between the two configurations shown in FIGS. 2 and 3. As described above, however, the scan engine 308 is mounted within the reader 300 to be rotatable with respect to the housing 302 about an axis of rotation 314 such that as the operator 312 changes the orientation of the housing 302 the orientation of the scan engine 308 remains constant or substantially constant. Thus, the operator 312 can simultaneously use the reader 300 in the convenient point-and-shoot orientation and in an orientation that allows the operator to most conveniently view the electronic display.

Figure 4:
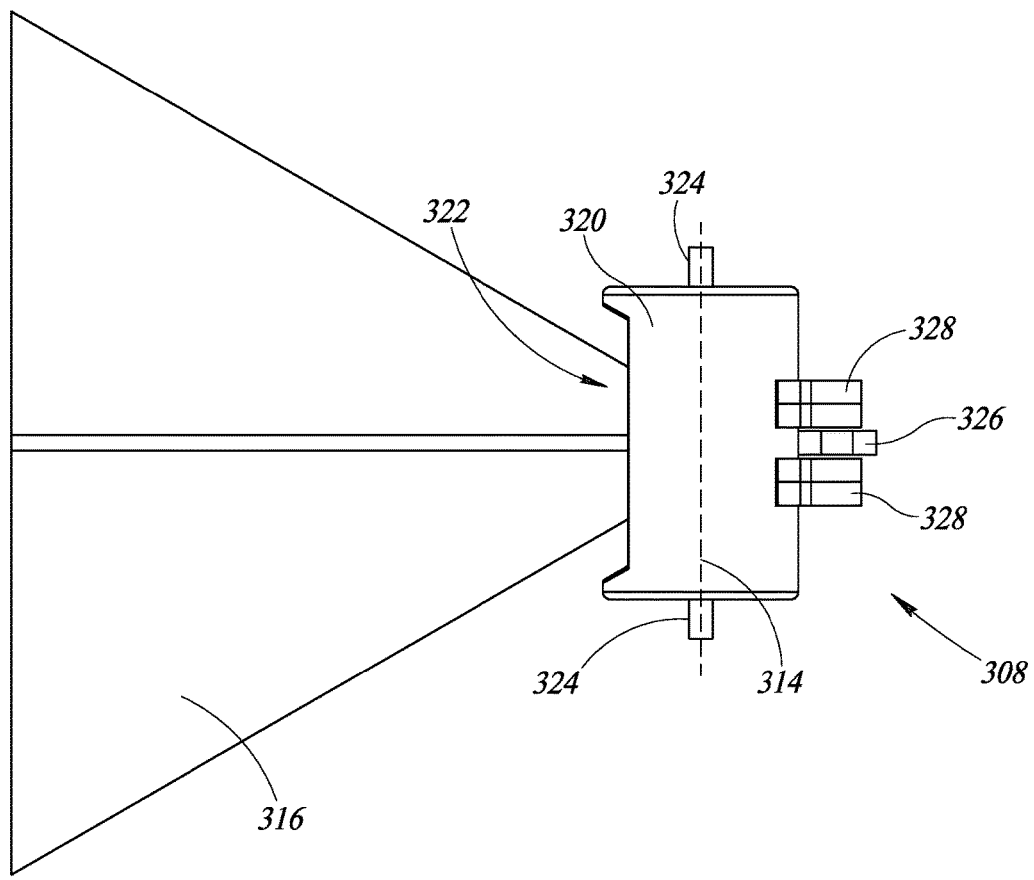
FIG. 4 is a diagram showing a top view of the first variable orientation scan engine of FIGS. 2 and 3, according to at least one illustrated embodiment.

FIG. 4 shows a top view of the scan engine 308, which can include a generally or substantially cylindrical body 320 having a central longitudinal axis coincident with the axis of rotation 314. The cylindrical body 320 can house the various components of the scan engine 308 described above, and an aperture 322 in a front face of the cylindrical body 320 can allow illumination to pass out of the scan engine 308 and light reflected by a machine readable symbol to pass into the scan engine 308. The scan engine 308 can also include a pair of pegs or pins 324 coupled to opposite circular ends of the cylindrical body 320 and extending outwardly from the centers of the respective circular ends along axes coincident with the axis of rotation 314. The pins 324 can be mounted to complementary mating components inside the housing 302 to allow the scan engine 308 to rotate about the axis 314.

To actuate rotation of the scan engine 308 about the axis 314 with respect to the housing 302, the reader 300 can include an actuator including a solenoid or coiled wire 326 rigidly mounted to the scan engine 308 and one or more magnets 328 rigidly mounted to the housing 302, the magnets 328 positioned to interact with a magnetic field induced by a current running through the coiled wire 326. Alternative implementations can reverse the positions of the coiled wire 326 and the magnets 328 such that the coiled wire 326 is rigidly mounted to the housing 302 and the magnets 328 are rigidly mounted to the scan engine 308.

The coiled wire 326 can include a series of loops that extend partially around the cylindrical body 320 of the scan engine 308, then radially away from the scan engine 308, then partially around the cylindrical body 320 of the scan engine 308 in the opposite direction, and then radially back toward the scan engine 308. The magnets 328 can have arcuate or curved bodies that extend partially around the cylindrical body 320 of the scan engine 308 a greater distance than the coiled wire 326, such as twice as far around the cylindrical body 320 as the coiled wire 326. The coiled wire 326 can extend outward from the cylindrical body 320 at a location on the cylindrical body opposite to the aperture 322 and at a center of the cylindrical body between its two circular ends. A first one of the magnets 328 can be positioned adjacent to a first side of the coiled wire 326 and a second one of the magnets 328 can be positioned adjacent to a second side of the coiled wire 326 opposite to the first side, such that the coiled wire 326 is sandwiched between the first and second magnets 328.

To use the reader 300, an operating orientation of the field of view 316 about the axis of rotation 314 with respect to gravity can be selected or determined. For example, the operating orientation of the field of view 316 can be selected to be horizontal, or 90° about the axis of rotation 314 with respect to gravity. An accelerometer 330 (e.g., a one-axis, two-axis, or three-axis accelerometer) can be coupled to the housing 302 to measure an orientation of the housing 302 about the axis of rotation 314 with respect to gravity. Based on the measurement from the accelerometer 330 and the operating orientation of the field of view 316, a calculated orientation of the scan engine 308 with respect to the housing 302 that leaves the field of view 316 at the operating orientation can be determined. A current can then be driven through the coiled wire 326 to create a magnetic field to interact with the magnets 328 to actuate the scan engine 308 to rotate about the axis of rotation 314 to the calculated orientation with respect to the housing 302, thus leaving the field of view 316 at the operating orientation.

In an alternative implementation, the accelerometer 330 can be positioned on the scan engine 308 rather than on the housing 302, to measure an orientation of the scan engine 208 about the axis of rotation 314 with respect to gravity. In such an implementation, the operating orientation of the field of view 316 about the axis of rotation 314 with respect to gravity can be selected or determined. Based on the measurement from the accelerometer and the operating orientation of the field of view 316, a current can be driven through the coiled wire 326 to create a magnetic field to interact with the magnets 328 to actuate the scan engine 308 to rotate about the axis of rotation 314 until the field of view 316 is left at the operating orientation.

In another implementation, a first accelerometer can be coupled to the housing 302 and a second accelerometer can be coupled to the scan engine 308, and output signals from both accelerometers can be used to actuate the scan engine 308 to rotate about the axis of rotation 314 until the field of view 316 is at the operating orientation.

Figure 5:
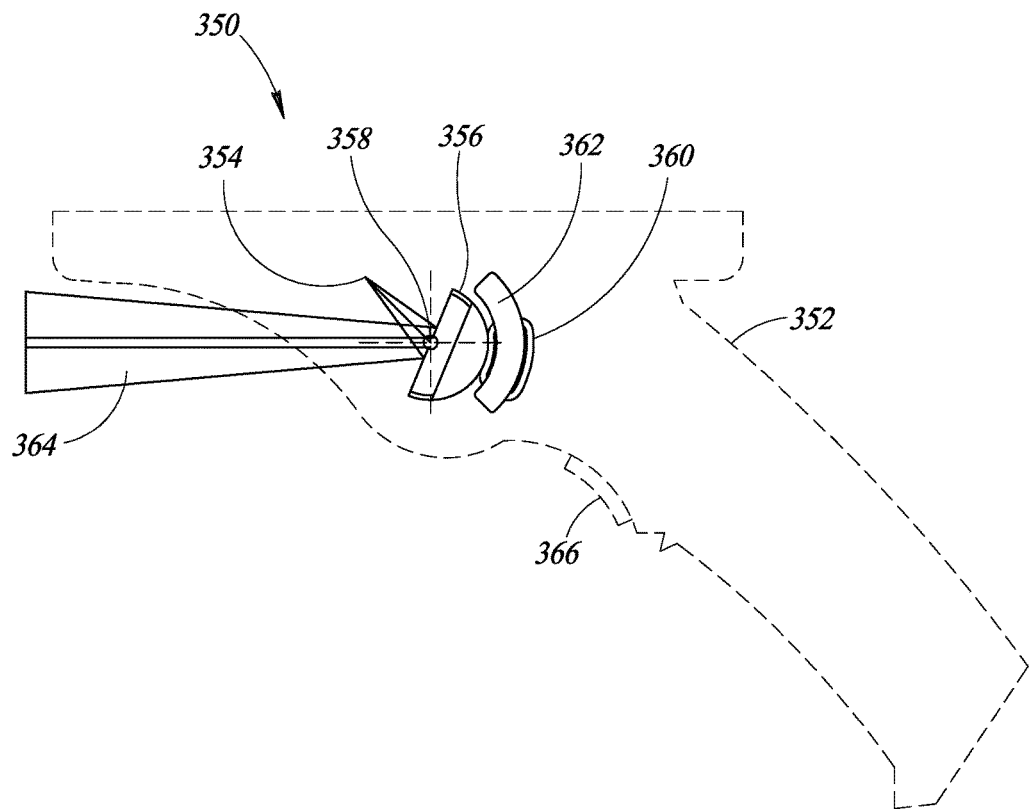
FIG. 5 is a diagram of another machine readable symbol reader having a second variable orientation scan engine in a first orientation with respect to a housing of the reader, according to at least one illustrated embodiment.
Figure 6:
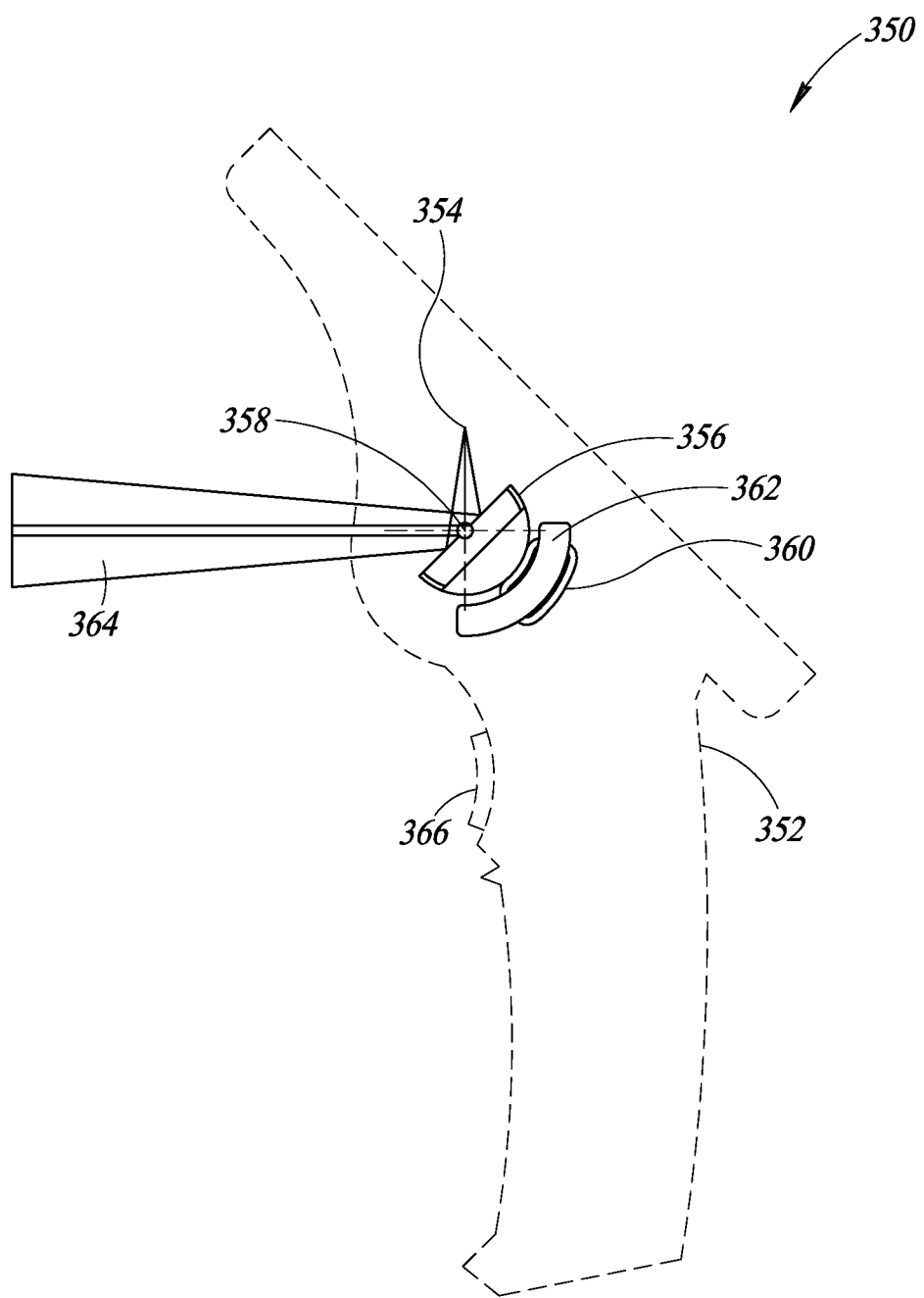
FIG. 6 is another diagram of the machine readable symbol reader of FIG. 5 having the second variable orientation scan engine in a second orientation with respect to the housing, according to at least one illustrated embodiment.
Figure 7:
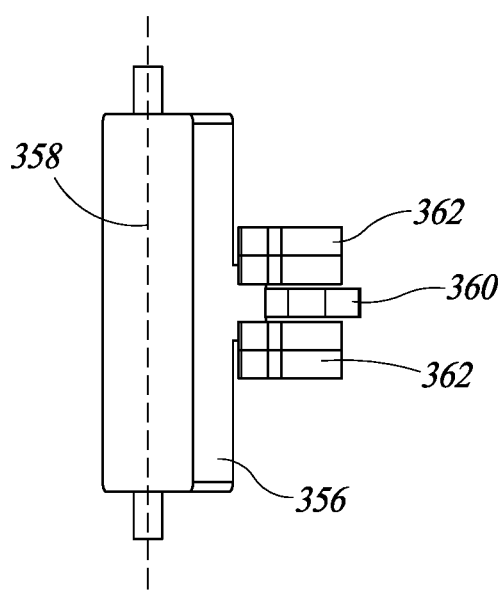
FIG. 7 is a diagram showing a top view of the second variable orientation scan engine of FIGS. 5 and 6, according to at least one illustrated embodiment.

FIGS. 5-7 illustrate another machine readable symbol reader 350 that has many of the same features as the reader 300 described above, and except for specific differences described herein, the reader 350 can include any combination of the features of the reader 300 described above, including a housing 352 similar to the housing 302 and a field of view 364 similar to field of view 316. Reader 350 differs from reader 300 in that it includes a scan engine 354 at a fixed location and orientation with respect to the housing 352. In place of the rotatable scan engine 308, the reader 350 includes a reflective mirror 356 that is rotatable with respect to an axis of rotation 358 and that can reflect a laser scanning beam or other illumination from the scan engine 354 out of the reader 350, as well as reflect light returned from a machine readable symbol into the scan engine 354.

The reader 350 includes a coiled wire 360 and magnets 362 similar to the coiled wire 326 and magnets 328, to drive rotation of the mirror 356 about the axis 358 as described above. The mirror 356 is rotated half as far about the axis 358 for a given rotation of the housing 352 as the scan engine 308 is about the axis 314 for the same rotation of the housing 302 to maintain the field of view 364 at the same orientation as the field of view 316. FIGS. 5 and 6 also illustrate that the reader 350 includes a trigger or button 366 where an operator's finger rests while holding the reader 350 (see FIGS. 2 and 3). The operator can pull the trigger or push the button 366 to actuate the reader 350 to scan a machine readable symbol. Any of the machine readable symbol readers described herein can include a similar trigger or button.

Figure 8:
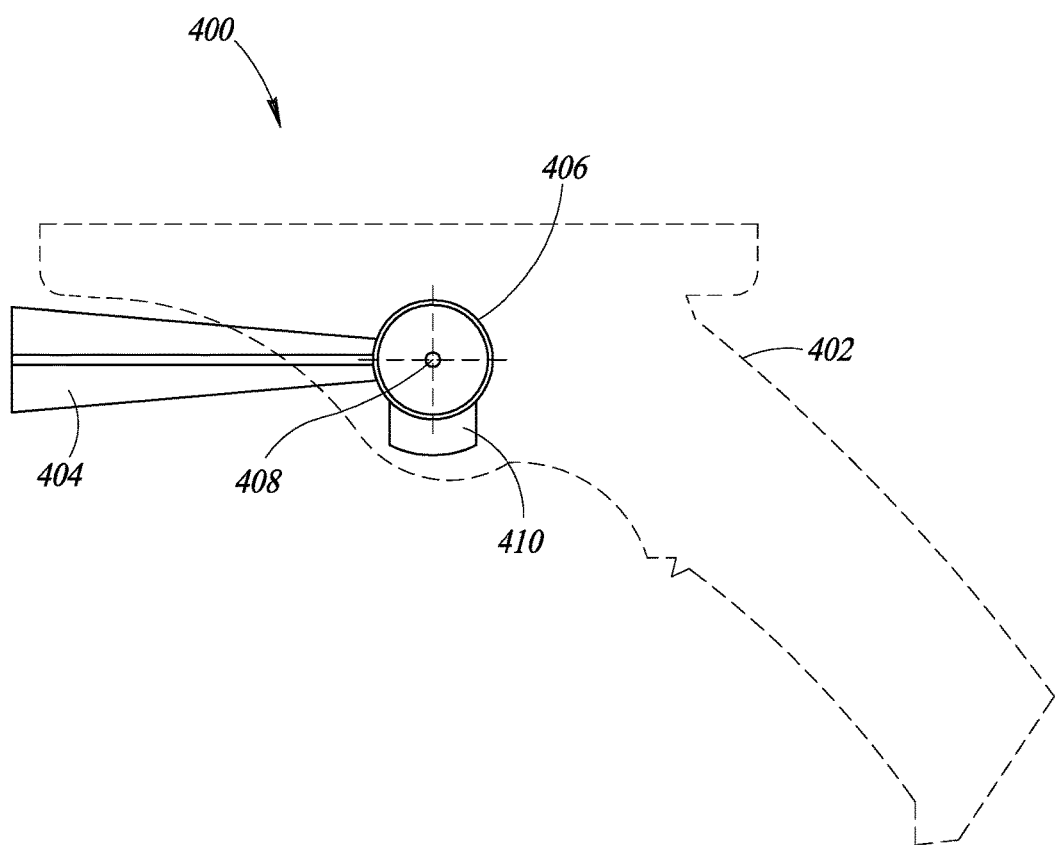
FIG. 8 is a diagram of another machine readable symbol reader having a third variable orientation scan engine in a first orientation with respect to a housing of the reader, according to at least one illustrated embodiment.
Figure 9:
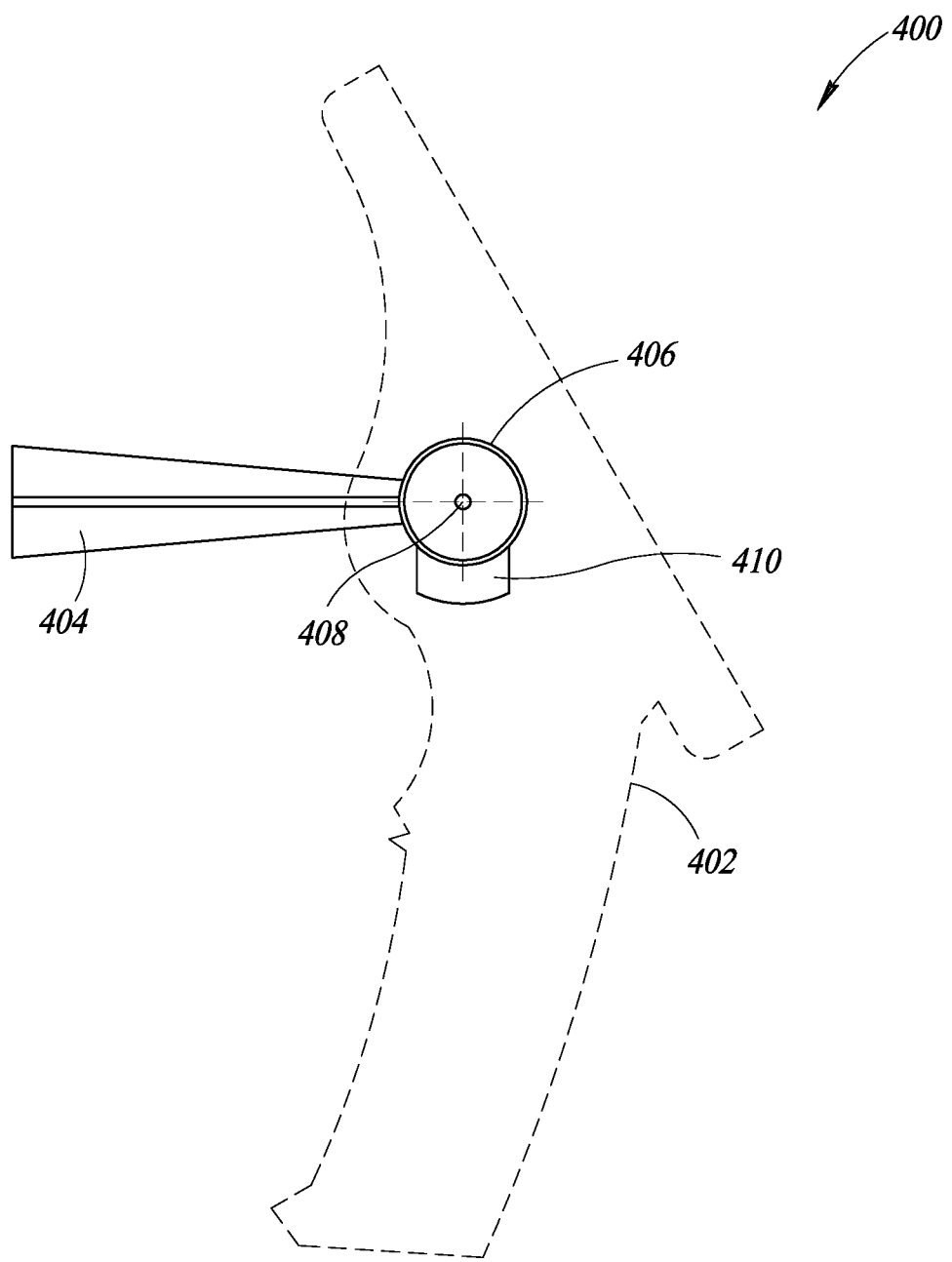
FIG. 9 is another diagram of the machine readable symbol reader of FIG. 8 having the third variable orientation scan engine in a second orientation with respect to the housing, according to at least one illustrated embodiment.

FIGS. 8 and 9 illustrate another machine readable symbol reader 400 that has many of the same features as the reader 300 described above, and except for specific differences described herein, the reader 400 can include any combination of the features of the reader 300 described above, including a housing 402 similar to the housing 302, a field of view 404 similar to the field of view 316, and a scan engine 406 similar to the scan engine 308 that is rotatable about an axis 408 similar to axis 314. Reader 400 differs from reader 300 in that it does not include the coiled wire 326 or magnets 328. In place of these components, the reader 400 includes an actuator including a weight or counterweight 410 coupled to the scan engine 406 to maintain the scan engine 406 at a constant orientation about the axis 408 with respect to gravity.

To use the reader 400, an operating orientation of the field of view 404 about the axis of rotation 408 with respect to gravity can be selected or determined. For example, the operating orientation of the field of view 404 can be selected to be horizontal, or 90° about the axis of rotation 408 with respect to gravity. The weight 410 can then be fixed to the scan engine 406 at a location around the circumference of its cylindrical body that leaves the field of view 404 at the operating orientation, such as at the bottom of the scan engine 406 if the operating orientation is selected to be horizontal. As the housing 402 is moved by an operator and rotates about the axis 408 with respect to gravity, the weight 410 can cause the scan engine 406 to rotate about the axis 408 with respect to the housing 410 to maintain the field of view 404 at the operating orientation.

In another implementation, the reader 400 can include a gyroscope coupled to the scan engine 406 instead of the weight 410, and the gyroscope can maintain the orientation of the scan engine 406 about the axis 408 with respect to gravity by causing the scan engine 406 to rotate about the axis 408 with respect to the housing 402 as an operator causes the housing 402 to rotate about the axis 408 with respect to gravity.

Figure 10:
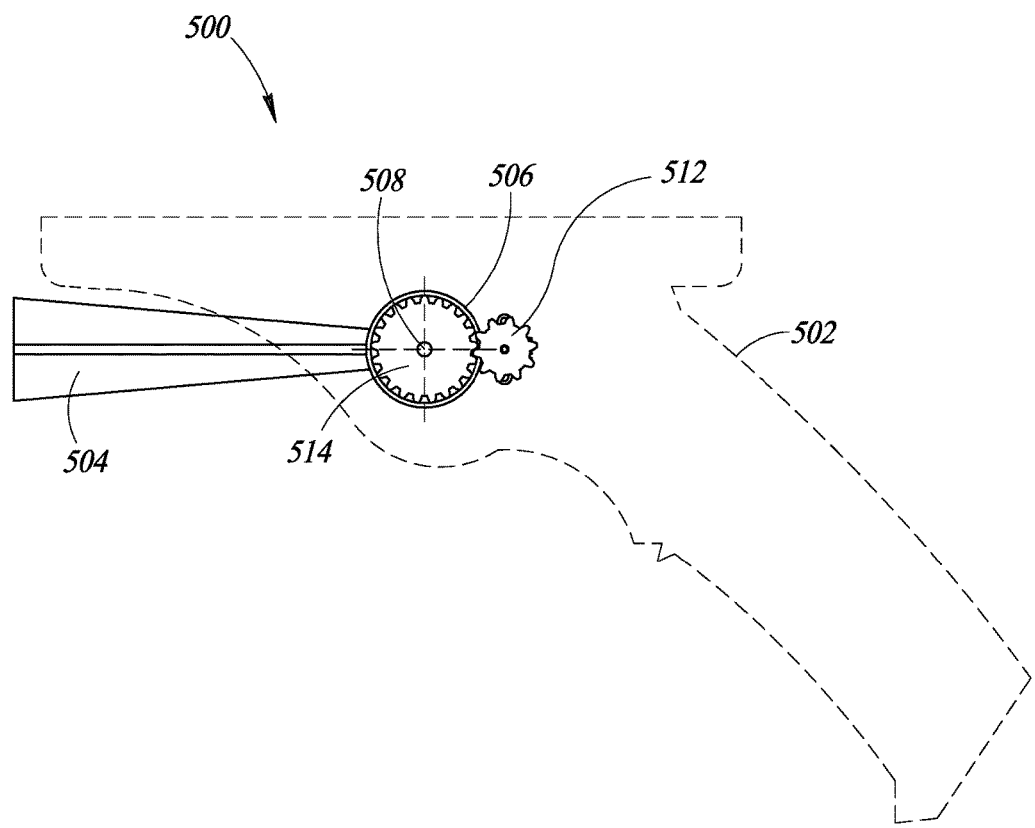
FIG. 10 is a diagram of another machine readable symbol reader having a fourth variable orientation scan engine in a first orientation with respect to a housing of the reader, according to at least one illustrated embodiment.
Figure 11:
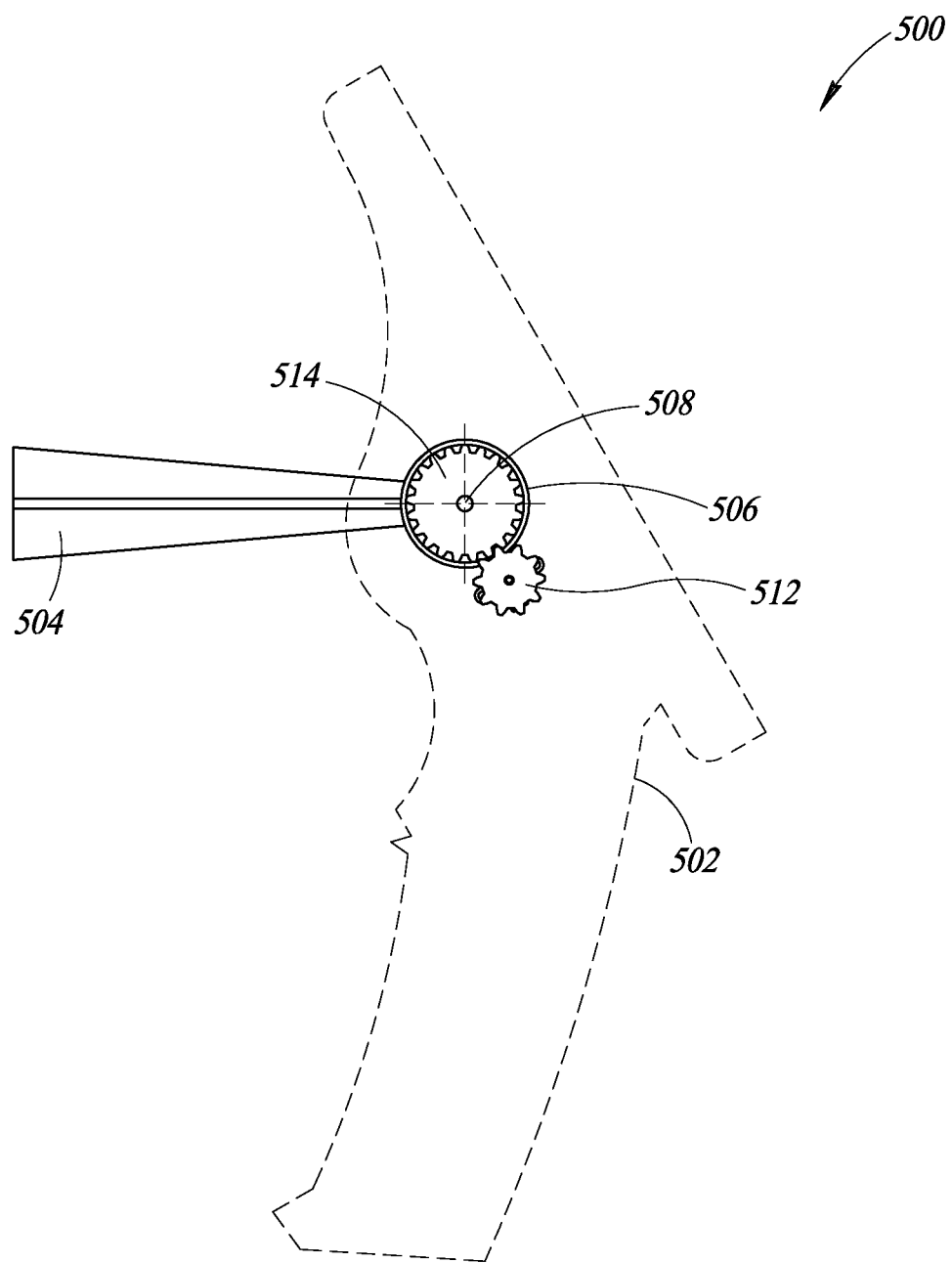
FIG. 11 is another diagram of the machine readable symbol reader of FIG. 10 having the fourth variable orientation scan engine in a second orientation with respect to the housing, according to at least one illustrated embodiment.
Figure 12:
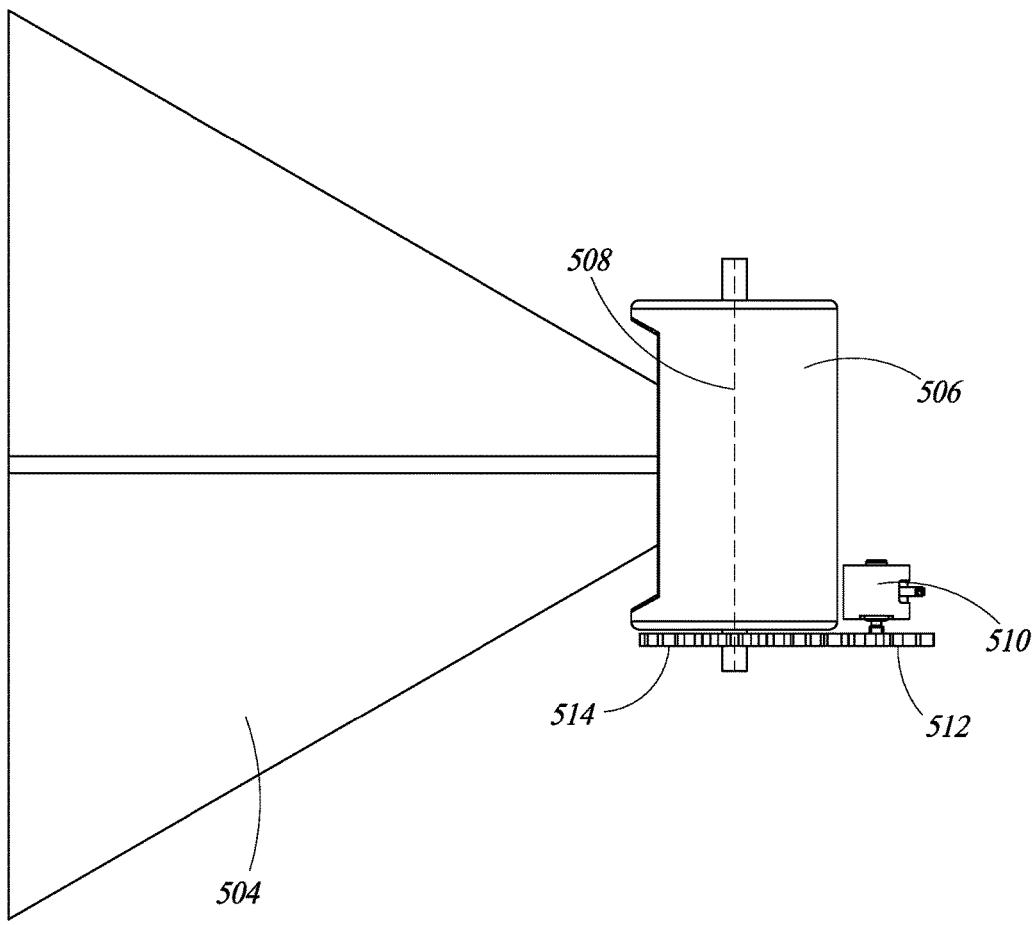
FIG. 12 is a diagram showing a top view of the fourth variable orientation scan engine of FIGS. 10 and 11, according to at least one illustrated embodiment.

FIGS. 10-12 illustrate another machine readable symbol reader 500 that has many of the same features as the reader 300 described above, and except for specific differences described herein, the reader 500 can include any combination of the features of the reader 300 described above, including a housing 502 similar to the housing 302, a field of view 504 similar to the field of view 316, and a scan engine 506 similar to the scan engine 308 that is rotatable about an axis 508 similar to axis 314. Reader 500 differs from reader 300 in that it does not include the coiled wire 326 or magnets 328. In place of these components, the reader 500 includes an actuator including an electric stepper motor 510 that turns a drive gear 512 that is engaged with a driven gear 514 fixed to the scan engine 506.

The reader 500 can be operated in ways similar to those described above for the reader 300. In particular, an operating orientation of the field of view 504 about the axis 508 with respect to gravity can be selected or determined. For example, the operating orientation of the field of view 504 can be selected to be horizontal, or 90° about the axis 508 with respect to gravity. An accelerometer can be coupled to the housing 502 to measure an orientation of the housing 502 about the axis 508 with respect to gravity. Based on the measurement from the accelerometer and the operating orientation of the field of view 504, a calculated orientation of the scan engine 506 with respect to the housing 502 that leaves the field of view 504 at the operating orientation can be determined. The stepper motor 510 can then be actuated to turn the drive gear 512 to turn the driven gear 514, and thereby to actuate the scan engine 506 to rotate about the axis 508 to the calculated orientation with respect to the housing 502, thus leaving the field of view 504 at the operating orientation.

In one alternative implementation, the accelerometer can be positioned on the scan engine 506 rather than on the housing 502 to measure an orientation of the scan engine 506 about the axis 508 with respect to gravity directly. In such an implementation, the operating orientation of the field of view 504 about the axis of rotation 508 with respect to gravity can be selected or determined. Based on the measurement from the accelerometer and the operating orientation of the field of view 504, the stepper motor 510 can be actuated to rotate the scan engine 506 about the axis 508 until the field of view 504 is left at the operating orientation.

In another alternative implementation, as also described above, a first accelerometer can be coupled to the housing 502 and a second accelerometer can be coupled to the scan engine 506, and both accelerometers can be used to actuate the scan engine 506 to rotate about the axis 508 until the field of view 504 is at the operating orientation.

Figure 13:
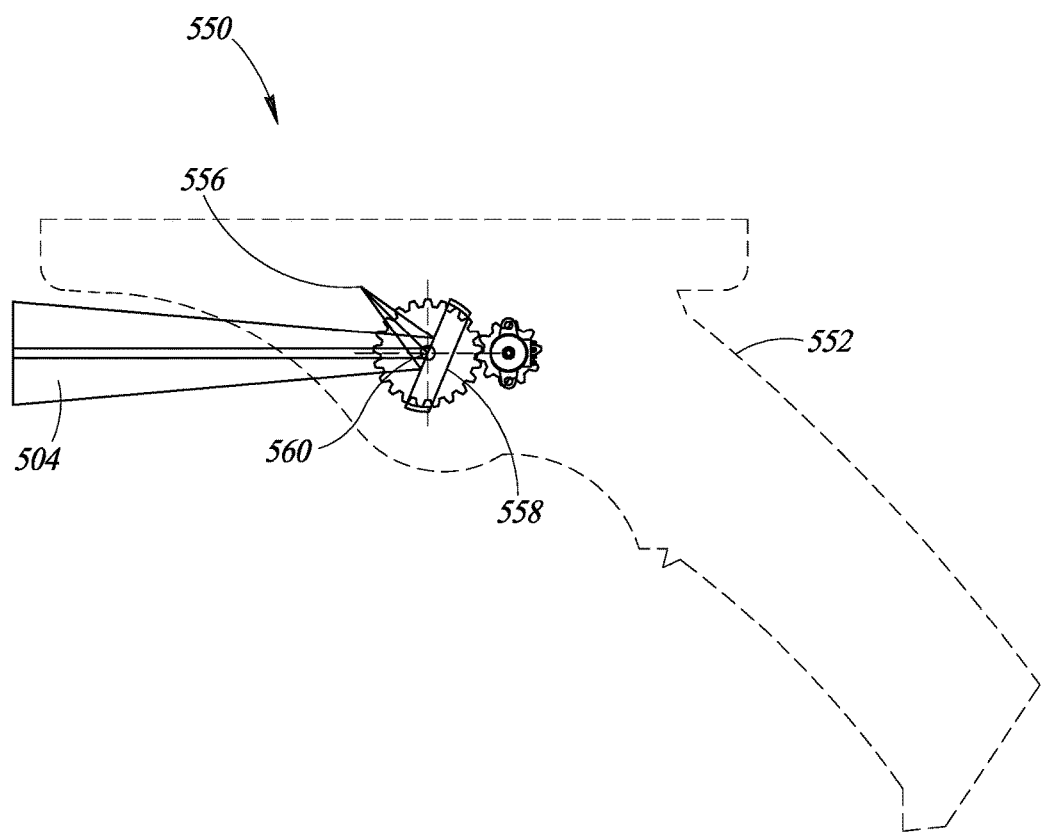
FIG. 13 is a diagram of another machine readable symbol reader having a fifth variable orientation scan engine in a first orientation with respect to a housing of the reader, according to at least one illustrated embodiment.
Figure 14:
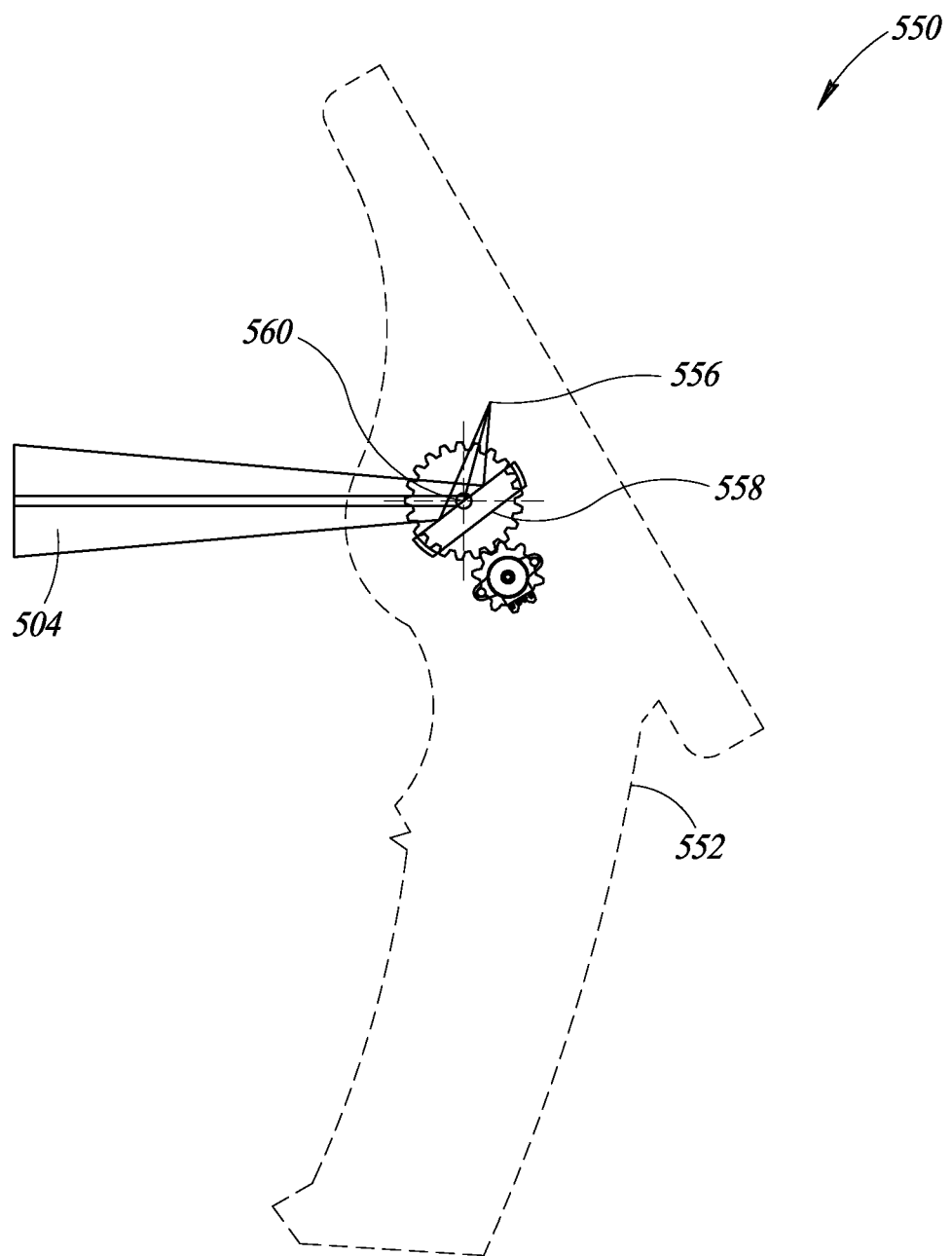
FIG. 14 is another diagram of the machine readable symbol reader of FIG. 13 having the fifth variable orientation scan engine in a second orientation with respect to the housing, according to at least one illustrated embodiment.
Figure 15:
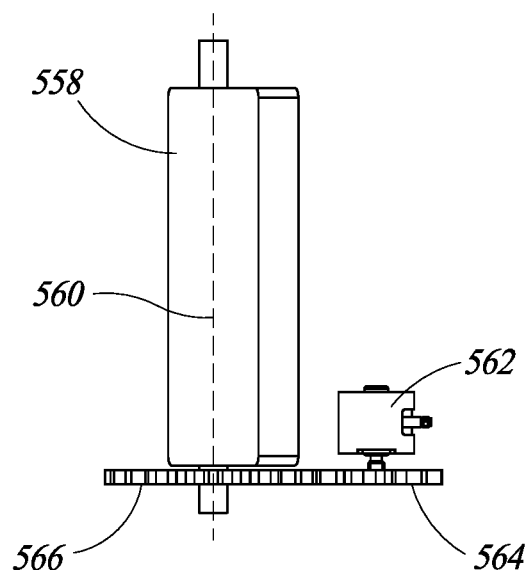
FIG. 15 is a diagram showing a top view of the fifth variable orientation scan engine of FIGS. 13 and 14, according to at least one illustrated embodiment.

FIGS. 13-15 illustrate another machine readable symbol reader 550 that has many of the same features as the reader 500 described above, and except for specific differences described herein, the reader 550 can include any combination of the features of the reader 500 described above, including a housing 552 similar to the housing 502 and a field of view 554 similar to field of view 504. Reader 550 differs from reader 500 in that it includes a scan engine 556 at a fixed location and orientation with respect to the housing 552. In place of the rotatable scan engine 506, the reader 550 includes a reflective mirror 558 that is rotatable with respect to an axis of rotation 560. The reader 550 includes an electric stepper motor 562, drive gear 564, and driven gear 566 similar to the stepper motor 510, drive gear 512, and driven gear 514, to drive rotation of the mirror 558 about the axis 560 as described above. The mirror 558 is rotated half as far about the axis 560 for a given rotation of the housing 552 as the scan engine 506 is about the axis 508 for the same rotation of the housing 502 to maintain the field of view 554 at the same orientation as the field of view 504.

Figure 16:
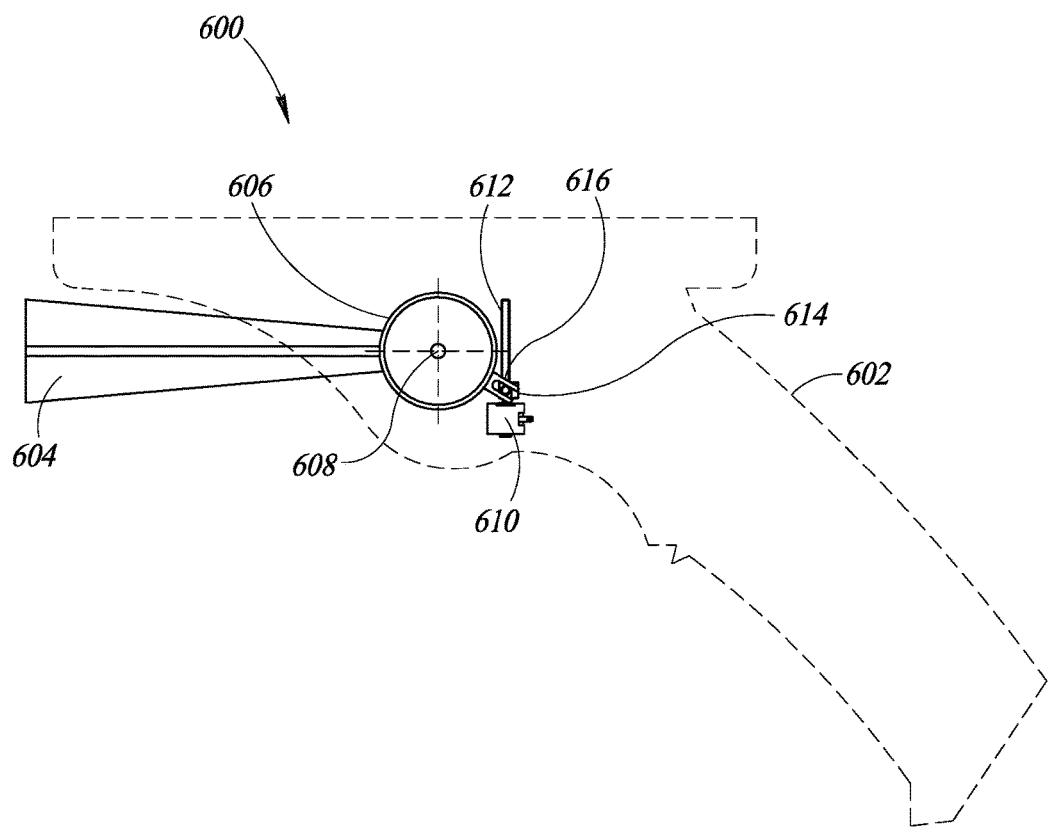
FIG. 16 is a diagram of another machine readable symbol reader having a sixth variable orientation scan engine in a first orientation with respect to a housing of the reader, according to at least one illustrated embodiment.
Figure 17:
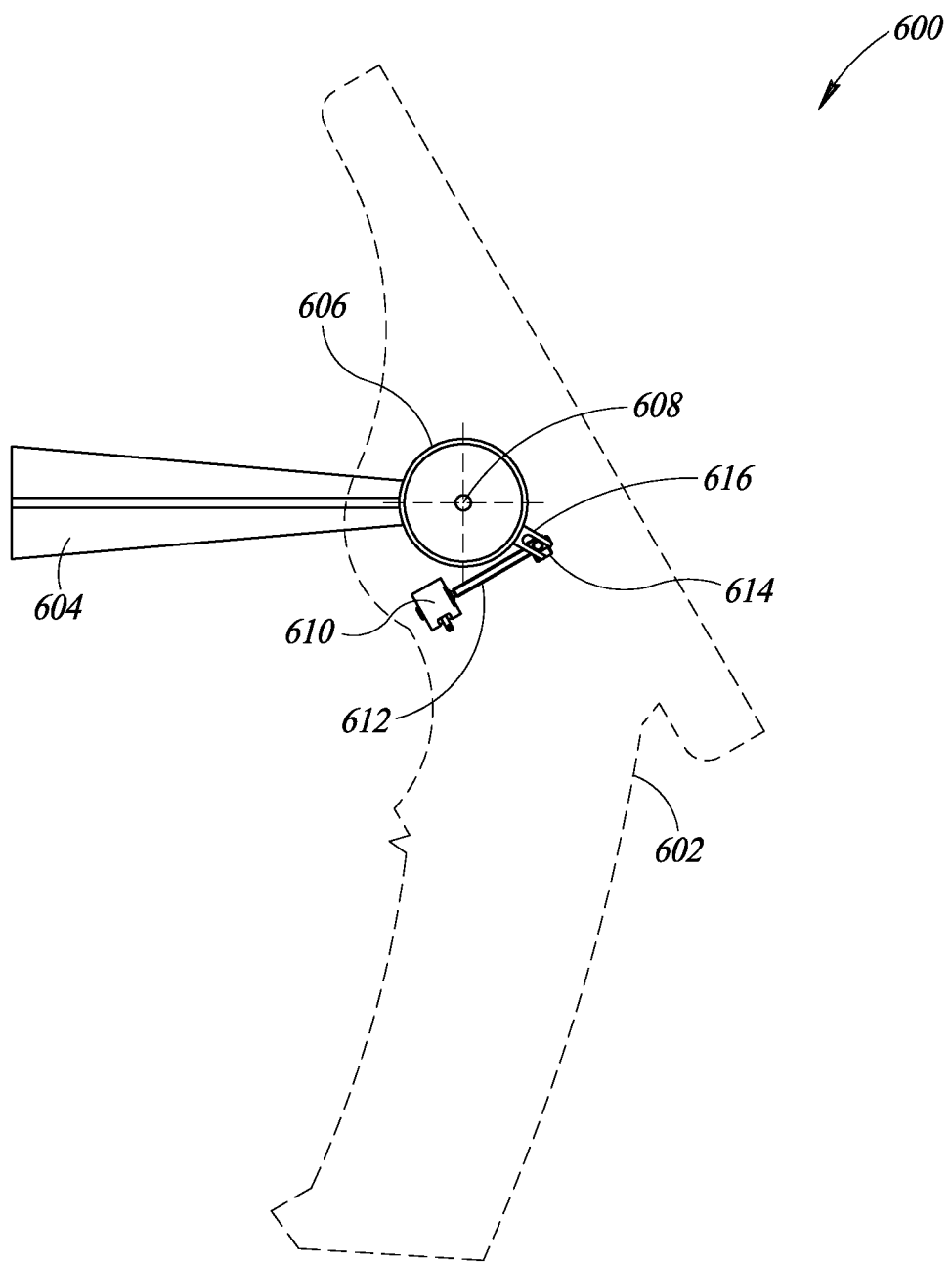
FIG. 17 is another diagram of the machine readable symbol reader of FIG. 16 having the sixth variable orientation scan engine in a second orientation with respect to the housing, according to at least one illustrated embodiment.
Figure 18:
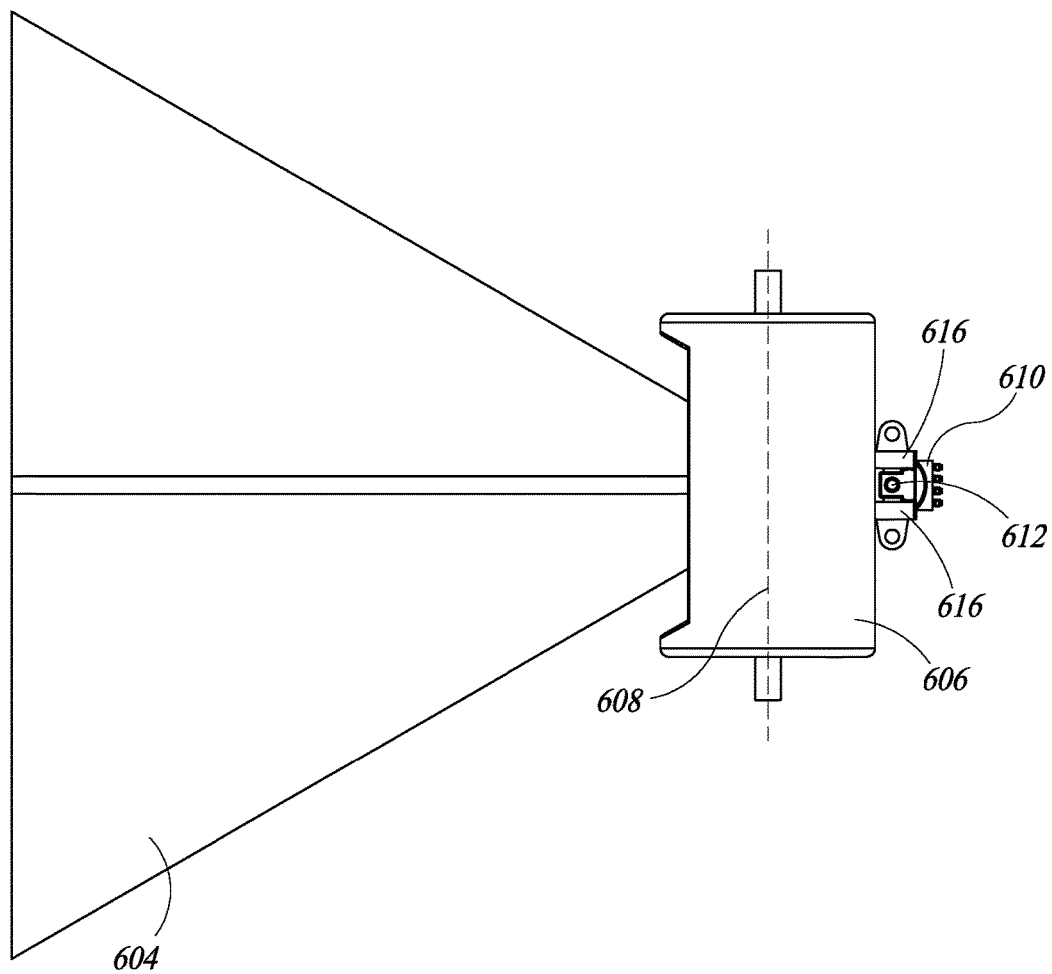
FIG. 18 is a diagram showing a top view of the sixth variable orientation scan engine of FIGS. 16 and 17, according to at least one illustrated embodiment.

FIGS. 16-18 illustrate another machine readable symbol reader 600 that has many of the same features as the reader 300 described above, and except for specific differences described herein, the reader 600 can include any combination of the features of the reader 300 described above, including a housing 602 similar to the housing 302, a field of view 604 similar to the field of view 316, and a scan engine 606 similar to the scan engine 308 that is rotatable about an axis 608 similar to axis 314. Reader 600 differs from reader 300 in that it does not include the coiled wire 326 or magnets 328. In place of these components, the reader 600 includes an actuator including an electric stepper motor 610 that turns a threaded rod 612 engaged with a complementarily threaded nut 614 coupled to a peripheral edge portion of the scan engine 606 by a set of lever arms 616 protruding radially outward from the cylindrical body of the scan engine 606.

The reader 600 can be operated in ways similar to those described above for the reader 300. In particular, an operating orientation of the field of view 604 about the axis 608 with respect to gravity can be selected or determined. For example, the operating orientation of the field of view 604 can be selected to be horizontal, or 90° about the axis 608 with respect to gravity. An accelerometer can be coupled to the housing 602 to measure an orientation of the housing 602 about the axis 608 with respect to gravity. Based on the measurement from the accelerometer and the operating orientation of the field of view 604, a calculated orientation of the scan engine 606 with respect to the housing 602 that leaves the field of view 604 at the operating orientation can be determined. The stepper motor 610 can then be actuated to turn the threaded rod 612 to drive longitudinal translation of the threaded nut 614 along the threaded rod 612, to turn the lever arms 616 about the axis 608, and thereby to actuate the scan engine 606 to rotate about the axis 608 to the calculated orientation with respect to the housing 602, thus leaving the field of view 604 at the operating orientation.

In one alternative implementation, the accelerometer can be positioned on the scan engine 606 rather than on the housing 602 to measure an orientation of the scan engine 606 about the axis 608 with respect to gravity directly. In such an implementation, the operating orientation of the field of view 604 about the axis of rotation 608 with respect to gravity can be selected or determined. Based on the measurement from the accelerometer and the operating orientation of the field of view 604, the stepper motor 610 can be actuated to rotate the scan engine 606 about the axis 608 until the field of view 604 is left at the operating orientation.

In another alternative implementation, as also described above, a first accelerometer can be coupled to the housing 602 and a second accelerometer can be coupled to the scan engine 606, and both accelerometers can be used to actuate the scan engine 606 to rotate about the axis 608 until the field of view 604 is at the operating orientation.

Figure 19:
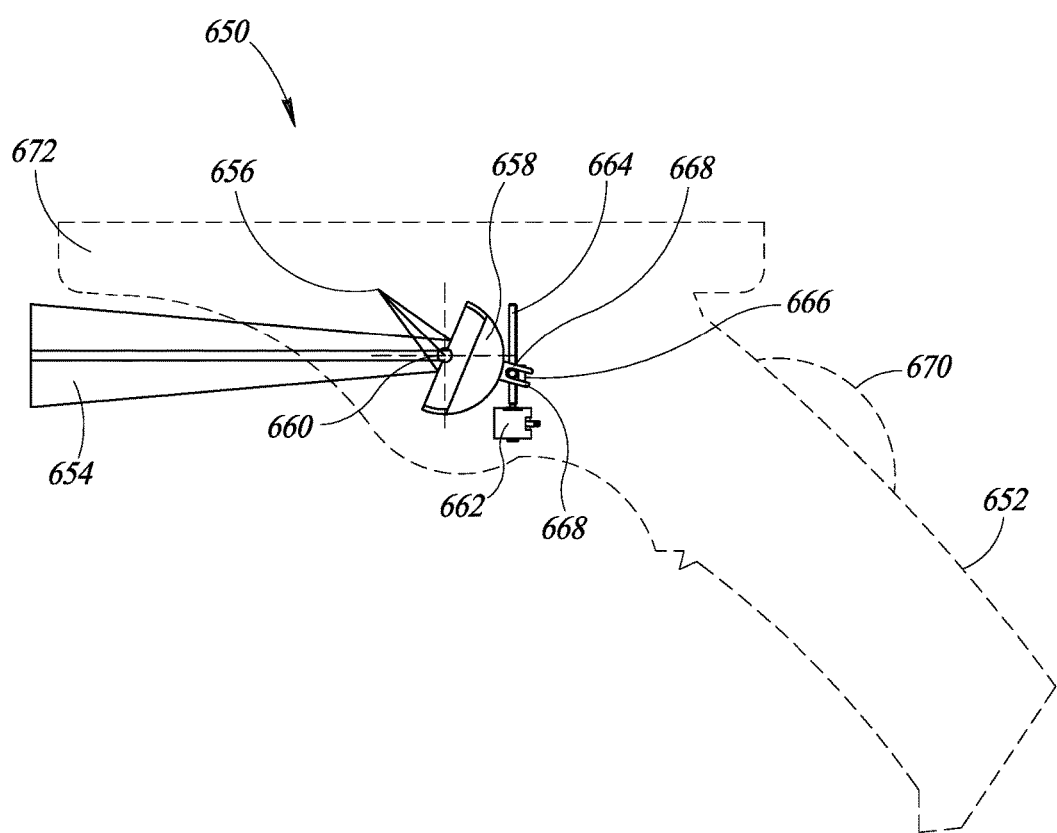
FIG. 19 is a diagram of another machine readable symbol reader having a seventh variable orientation scan engine in a first orientation with respect to a housing of the reader, according to at least one illustrated embodiment.
Figure 20:
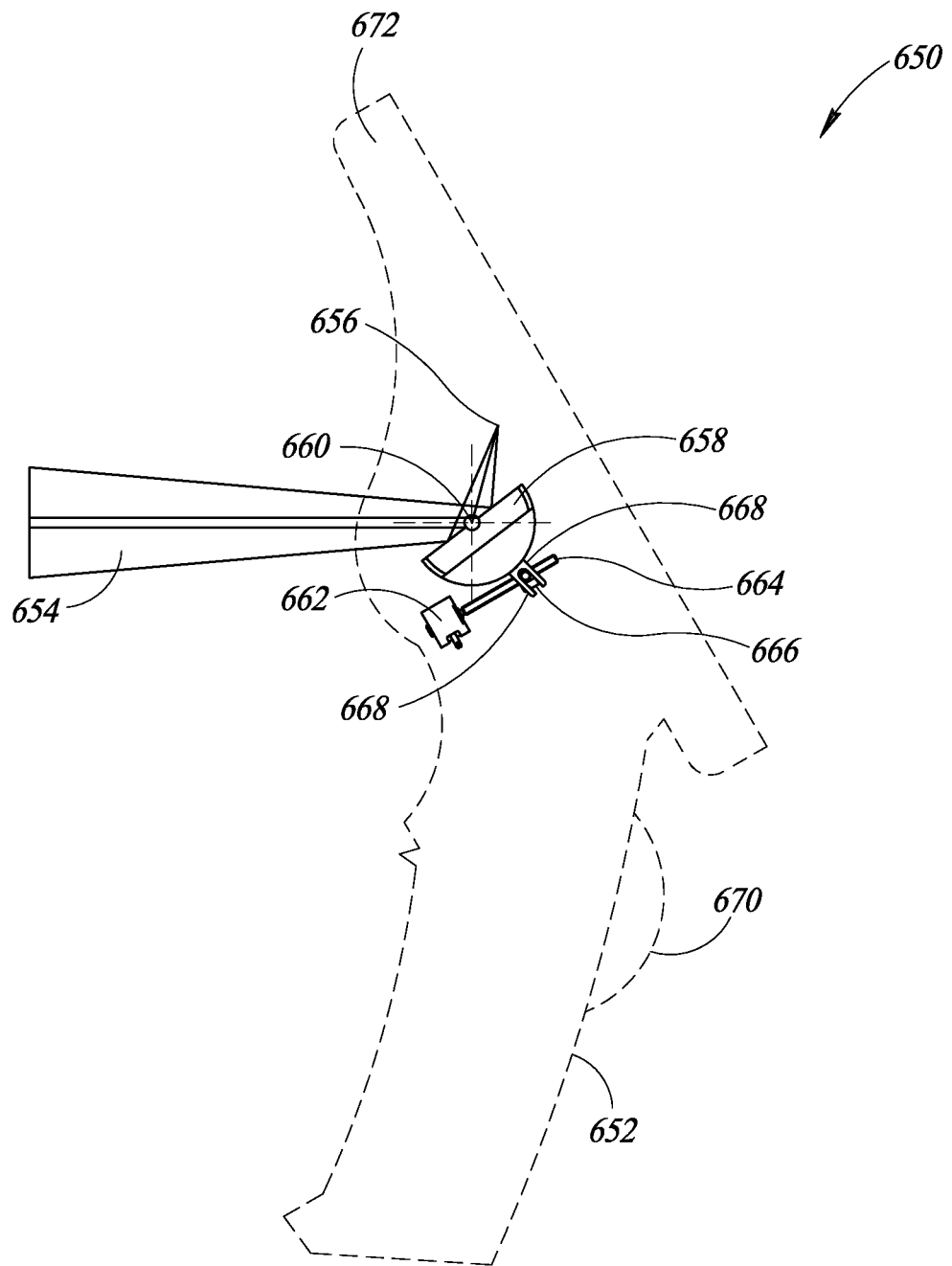
FIG. 20 is another diagram of the machine readable symbol reader of FIG. 19 having the seventh variable orientation scan engine in a second orientation with respect to the housing, according to at least one illustrated embodiment.
Figure 21:
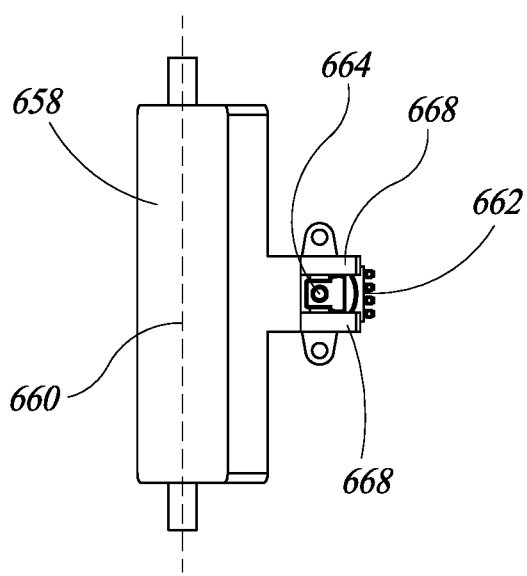
FIG. 21 is a diagram showing a top view of the seventh variable orientation scan engine of FIGS. 19 and 20, according to at least one illustrated embodiment.
Figure 22:
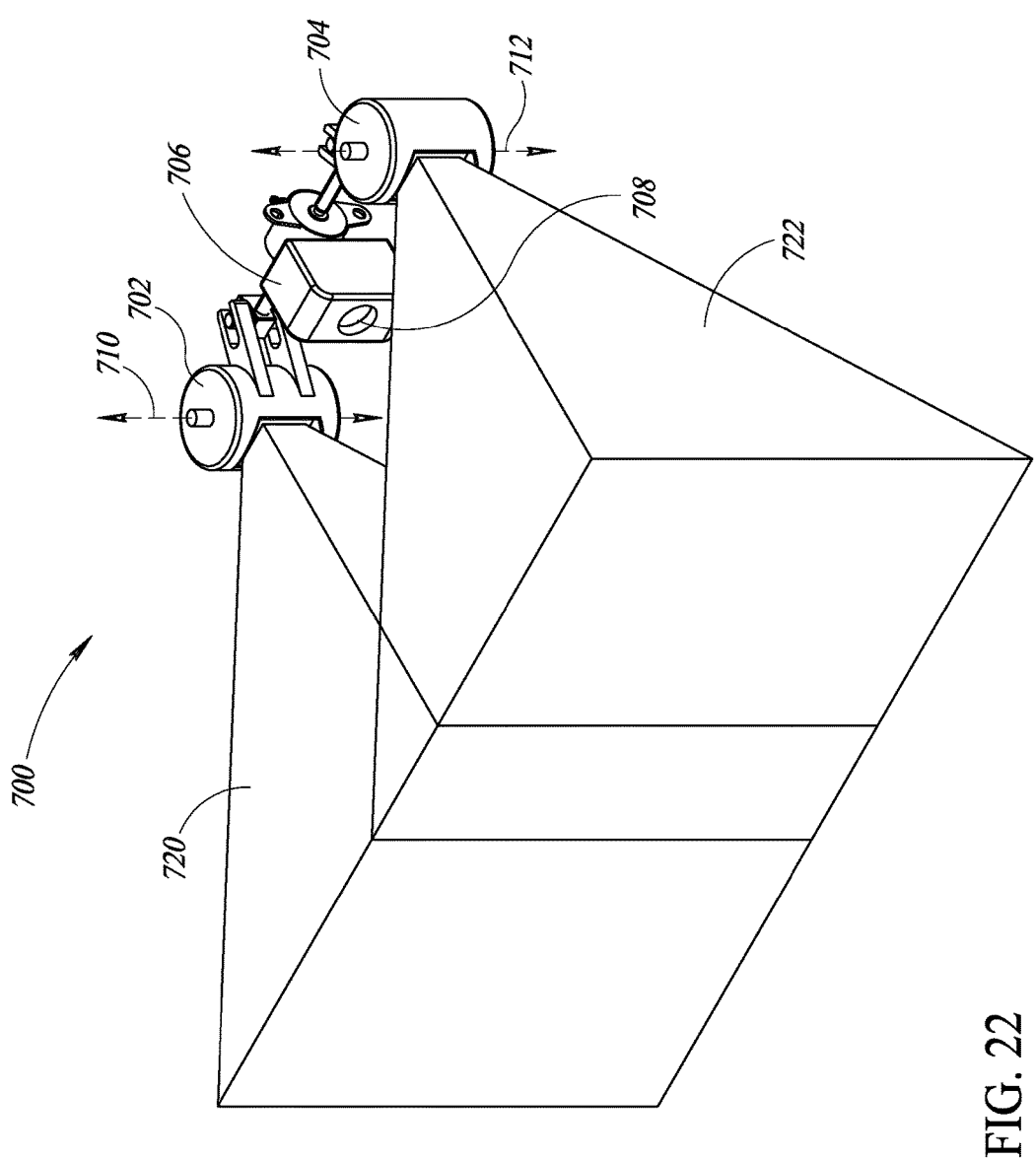
FIG. 22 is a diagram showing components of another machine readable symbol reader in a first configuration, according to at least one illustrated embodiment.

FIGS. 19-21 illustrate another machine readable symbol reader 650 that has many of the same features as the reader 600 described above, and except for specific differences described herein, the reader 650 can include any combination of the features of the reader 600 described above, including a housing 652 similar to the housing 602 and a field of view 654 similar to field of view 604. Reader 650 differs from reader 600 in that it includes a scan engine 656 at a fixed location and orientation with respect to the housing 652. In place of the rotatable scan engine 606, the reader 650 includes a reflective mirror 658 that is rotatable with respect to an axis of rotation 660. The reader 650 includes an electric stepper motor 662, threaded rod 664, threaded nut 666, and lever arms 668 similar to the stepper motor 610, threaded rod 612, threaded nut 614, and lever arms 616, to drive rotation of the mirror 658 about the axis 660 as described above. The mirror 658 is rotated half as far about the axis 660 for a given rotation of the housing 652 as the scan engine 606 is about the axis 608 for the same rotation of the housing 602 to maintain the field of view 654 at the same orientation as the field of view 604.

Each of the machine readable symbol readers described herein can automatically adjust an orientation of a scan engine with respect to a housing of the reader such that an orientation of the scan engine about its own axis of rotation remains constant or substantially constant in a global sense (e.g., with respect to gravity). Any of the machine readable symbol readers described herein can be used to automatically control and maintain an orientation of laser or other illumination as it leaves the reader, or to control the orientation of light returned from a machine readable symbol as it is received at a photosensor within the reader, or both.

FIGS. 19 and 20 also illustrate that that the reader 650 includes a roller wheel 670 mounted within a handle portion of the housing 652. An operator can turn the wheel 670 while operating the reader 650 to override other signals controlling or maintaining the orientation of the mirror 658 about the axis 660, and to control such orientation manually rather than automatically. The wheel 670 is interchangeable for this purpose with other types of mechanical manual controls such as knobs, trackballs, or sliders, or with electronic or electrical manual controls such as can be implemented through a touchscreen device installed within an upper display portion 672 of the reader 650. Such manual controls can be included in any of the machine readable symbol readers described herein.

Figure 23:
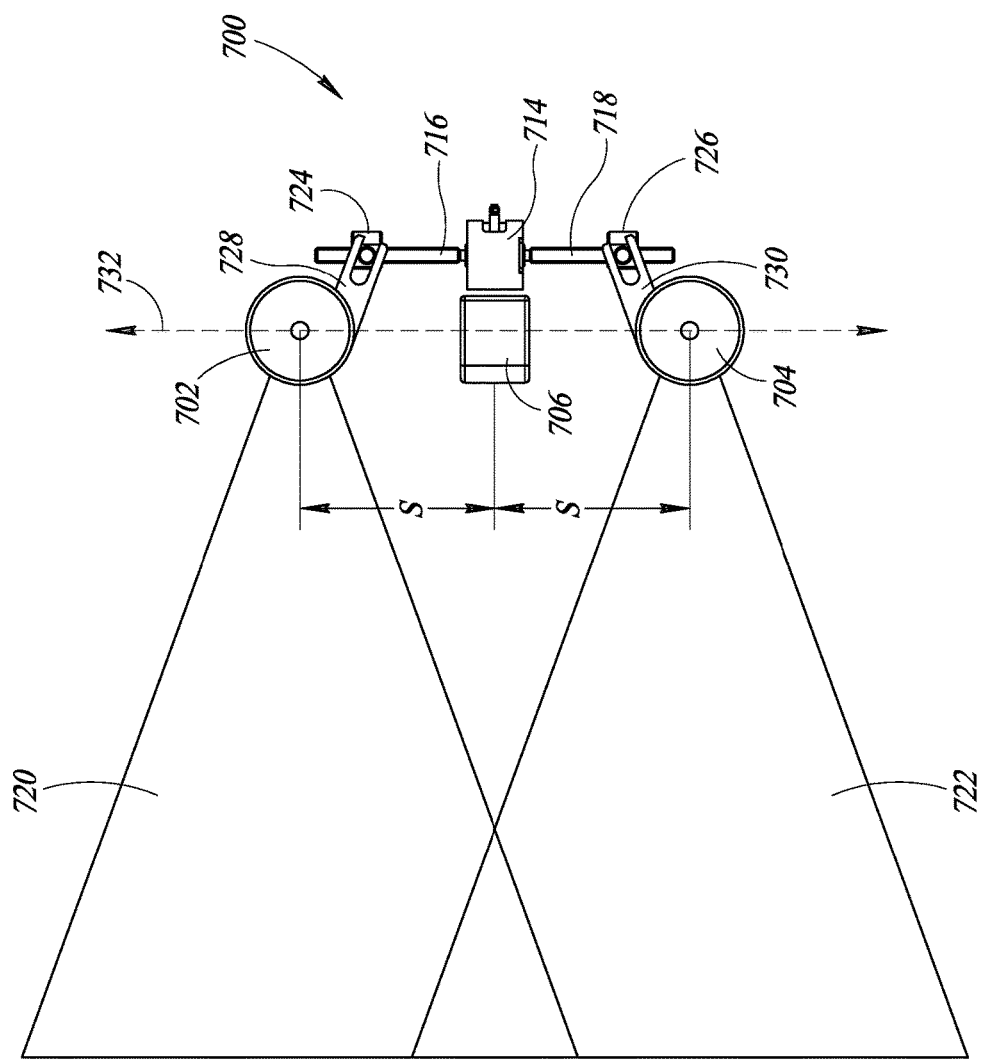
FIG. 23 is a diagram showing a top view of the components of the machine readable symbol reader of FIG. 22 in the first configuration, according to at least one illustrated embodiment.
Figure 24:
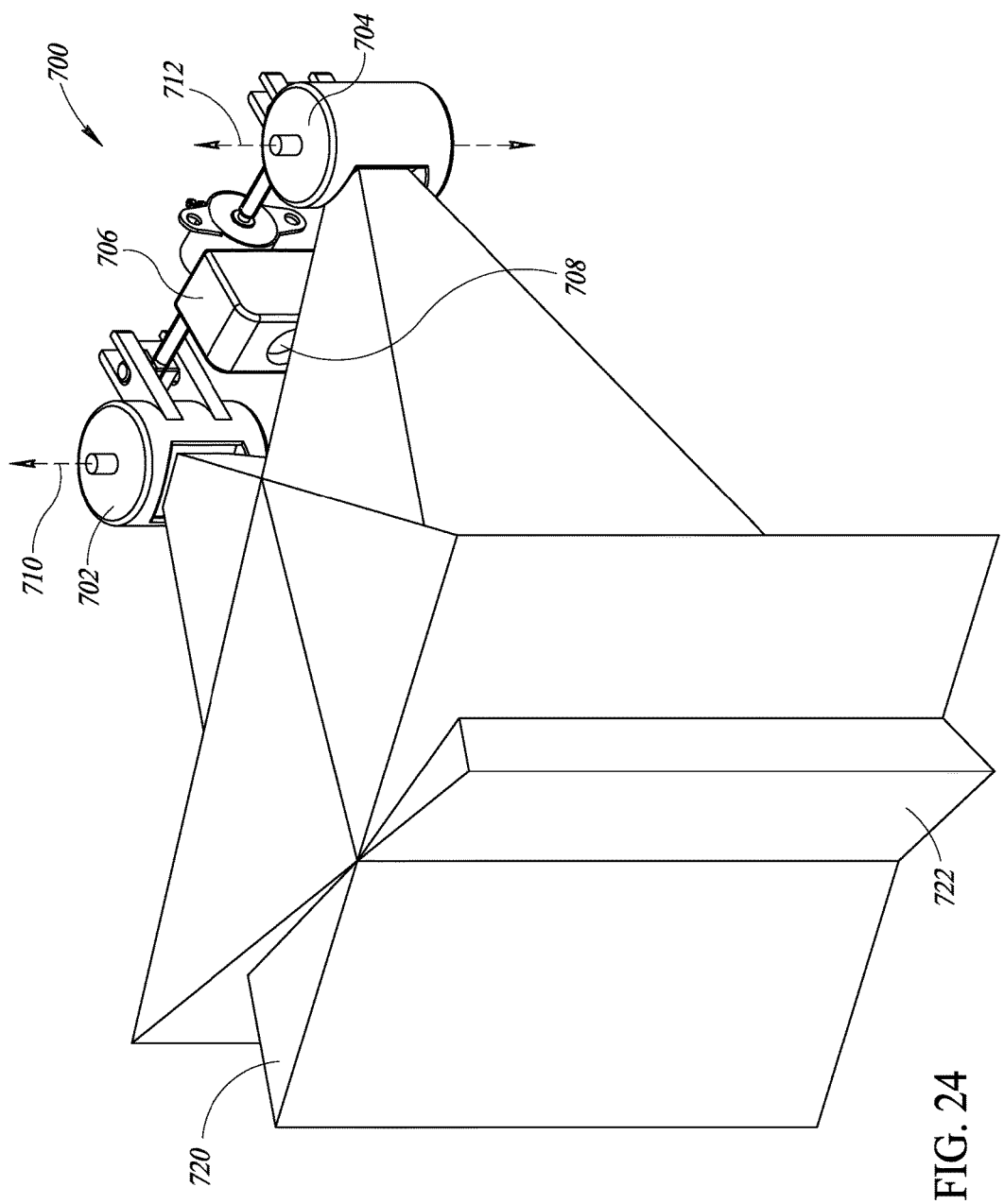
FIG. 24 is a diagram showing the components of the machine readable symbol reader of FIG. 22 in a second configuration, according to at least one illustrated embodiment.
Figure 25:
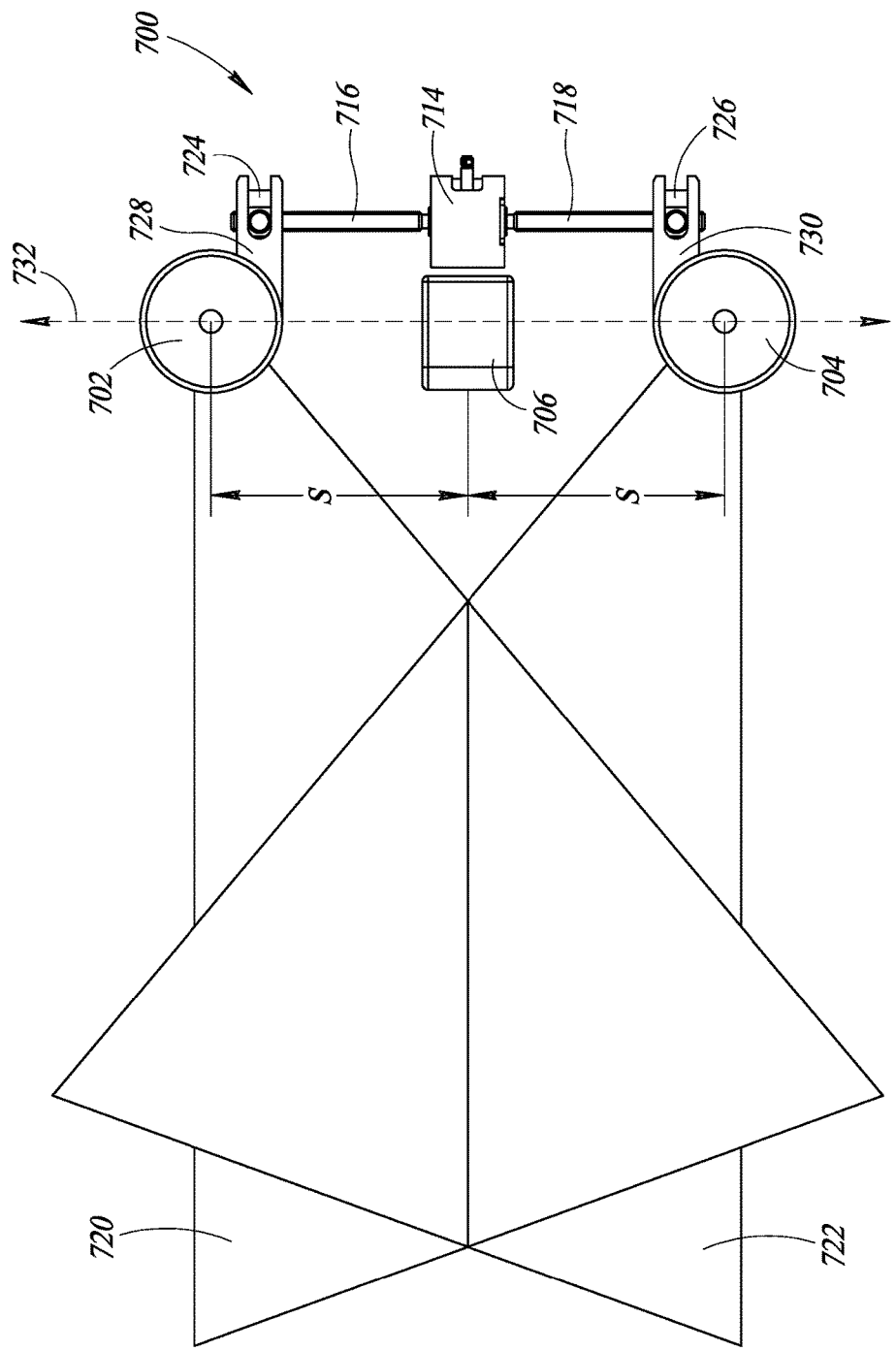
FIG. 25 is a diagram showing a top view of the components of the machine readable symbol reader of FIG. 22 in the second configuration, according to at least one illustrated embodiment.

FIGS. 22-25 illustrate components of another scan engine 700 of another machine readable symbol reader that that can include any combination of the features of the reader 300 described above. The scan engine 700 can include a first illumination module 702, a second illumination module 704, and a photosensor module 706 having a lens 708 in its front surface. The photosensor module 706 is positioned between, and spaced equidistantly apart from, the first and second illumination modules 702 and 704, such as by a spacing S (FIGS. 23 and 25), along a horizontal axis 732 (FIGS. 23 and 25).

The first illumination module 702 illuminates a first illuminated area or field of view 720 and the second illumination module 704 illuminates a second illuminated area or field of view 722. The first field of view 720 can overlap with the second field of view 722 to ensure that an entirety of a machine readable symbol positioned within a third field of view of the photosensor module 706 is adequately illuminated. The first and second illumination modules 702, 704 are rotatable about vertical axes 710, 712, respectively (FIGS. 22 and 24), so that the first and second fields of view 720, 722 can be rotated towards and away from one another to change an angle of incidence of the illumination from the illumination modules 702, 704 on a machine readable symbol positioned within the third field of view of the photosensor module 706. As illustrated in FIGS. 22-25, the vertical axes 710 and 712 can be perpendicular to the horizontal axis 732 and perpendicular to the fields of view 720 and 722, respectively. As further illustrated in FIGS. 22-25, the fields of view 720 and 722 can be parallel to one another and to the field of view of the photosensor module 706 in some configurations, and the field of view of the photosensor module 706 is also perpendicular to the vertical axes 710 and 712 and to the horizontal axis 732.

As illustrated in FIGS. 23 and 25, the scan engine 700 further includes mechanisms, similar to those described above with respect to reader 600, for actuating the illumination modules 702 and 704 to rotate about the axes 710 and 712, respectively. In particular, the scan engine 700 includes an actuator including an electric stepper motor 714 coupled to a surface of the photosensor module 706 opposite to the lens 708. The stepper motor 714 is coupled to a first threaded rod 716 that extends away from the stepper motor 714 toward the first illumination module 702 in a direction parallel to the horizontal axis 732. The first threaded rod 716 is engaged with a complementarily threaded nut 724 coupled to a peripheral edge portion of the first illumination module 702 by a set of lever arms 728 protruding radially outward from the cylindrical body of the illumination module 702.

The stepper motor 714 is also coupled to a second threaded rod 718 that extends away from the stepper motor 714 toward the second illumination module 704 in a direction parallel to the horizontal axis 732 and opposite to that of the first threaded rod 716. The second threaded rod 718 is engaged with a complementarily threaded nut 726 coupled to a peripheral edge portion of the second illumination module 704 by a set of lever arms 730 protruding radially outward from the cylindrical body of the illumination module 704. The stepper motor 714 can be actuated to turn the threaded rods 716 and 718 to drive longitudinal translation of the threaded nuts 724 and 726 along the threaded rods 716 and 718, respectively, to turn the lever arms 728 and 730 about the axes 710 and 712, respectively, and thereby to actuate the illumination modules 702 and 704 to rotate about the axes 710 and 712, respectively, to move the first and second fields of view 720 and 722 toward or away from one another.

In some implementations, the stepper motor 714 turns the first and second threaded rods 716, 718 at the same speed in opposite directions so that the illumination modules 702 and 704 rotate about the axes 710 and 712 at the same speed in opposite directions so that the first and second fields of view 720, 722 move toward or away from one another at the same rate. For example, the stepper motor 714 can turn the first and second threaded rods 716, 718 so that the first illumination module 702 rotates counter-clockwise when viewed from above, as seen in FIGS. 23 and 25, and so that the second illumination module 704 rotates clockwise when viewed from above, to move the fields of view 720, 722 toward one another. As another example, the stepper motor 714 can turn the first and second threaded rods 716, 718 so that the first illumination module 702 rotates clockwise when viewed from above and the second illumination module 704 rotates counter-clockwise when viewed from above, to move the fields of view 720, 722 away from one another.

In other implementations, the stepper motor 714 turns the first and second threaded rods 716, 718 at the same speed in the same direction, and the threaded rods 716 and 718 have oppositely-oriented threads to one another, so that the illumination modules 702 and 704 rotate about the axes 710 and 712 at the same speed in opposite directions so that the first and second fields of view 720, 722 move toward or away from one another. In other implementations, the illumination modules 702, 704 are independently rotatable about the respective vertical axes 710, 712. The stepper motor 714 can be controlled to actuate rotation of the illumination modules 702 and 704, based on the spacing S or any other relevant variable, to achieve a desired illumination angle for scanning a machine readable symbol within the field of view of the photosensor module 706.

The scan engine 700 can be incorporated into any one of the scan engines and any one of the machine readable symbol readers described herein, or can be actuated by a MEMS actuator, by digital light processing technologies, or by any other suitable actuator, such that the scan engine 700 is rotatable as a unit about the horizontal axis 732. The scan engine 700 can include a single one, or more than two illumination modules. The scan engine 700 can be particularly useful in scanning machine readable symbols that are direct part marked on or engraved into a workpiece. For example, the ability to read direct part marked symbols can be relatively highly dependent upon an angle of incidence of the illumination, and thus the ability to control the orientations of illumination modules with respect to a photosensor module can be particularly advantageous.

Those of skill in the art will recognize that many of the methods or algorithms set out herein may employ additional acts, may omit some acts, and/or may execute acts in a different order than specified. The various embodiments described above can be combined to provide further embodiments. Aspects of the embodiments can be modified, if necessary, to employ additional systems, circuits and concepts to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A machine readable symbol reader, comprising:
   a housing including a handle to be held by an operator;
   a scan engine having a field of view that extends outward from the housing, the scan engine including a plurality of illumination sources each positioned and oriented to illuminate the field of view, the scan engine mounted to the housing so that the field of view and illumination from each of the illumination sources are rotatable about an axis of rotation with respect to the housing;
   an accelerometer to output a signal that indicates an orientation of a component of the machine readable symbol reader with respect to gravity;
   a controller responsive to the orientation indicated by the signal output by the accelerometer to control rotation of the field of view and illumination from each of the illumination sources; and
   an actuator responsive to the controller. the actuator supported by the housing and coupled to the scan engine such that the actuator rotates the field of view about the axis of rotation with respect to the housing based on the signal from the accelerometer and response from the controller to maintain the field of view from each of the illumination sources at a constant orientation about the axis of rotation with respect to gravity as an orientation of the housing about the axis of rotation with respect to gravity changes.

2. The machine readable symbol reader of claim 1 wherein the scan engine includes a photosensor array.

3. The machine readable symbol reader of claim 1 wherein the actuator comprises:
   a coiled wire and a magnet positioned to interact with a magnetic field induced by a current that runs through the coiled wire to actuate the scan engine to rotate about the axis of rotation with respect to the housing in response to the signal output by the accelerometer and response from the controller.

4. The machine readable symbol reader of claim 1, further comprising:
   a mirror; and
   the actuator includes a coiled wire and a magnet positioned to interact with a magnetic field induced by a current that runs through the coiled wire to actuate the mirror to rotate about the axis of rotation with respect to the housing in response to the signal output by the accelerometer, and response from the controller.

5. The machine readable symbol reader of claim 1, wherein the actuator comprises:
   a motor coupled to the housing and positioned to actuate the scan engine to rotate about the axis of rotation with respect to the housing in response to the signal output by the accelerometer and response from the controller.

6. The machine readable symbol reader of claim 1, further comprising:

a mirror; and the actuator includes a motor coupled to the housing and positioned to actuate the mirror to rotate about the axis of rotation with respect to the housing in response to the signal output by the accelerometer and response from the controller.

7. The machine readable symbol reader of claim 1 wherein the axis of rotation extends substantially perpendicularly to the field of view.

8. The machine readable symbol reader of claim 1 wherein the axis of rotation extends substantially perpendicularly with respect to gravity when the operator holds the machine readable symbol reader by the handle.

9. The machine readable symbol reader of claim 1 wherein the orientation of the component is an orientation of the housing.

10. The machine readable symbol reader of claim 1 wherein the orientation of the component is an orientation of the scan engine.

11. The machine readable symbol reader of claim 1 wherein the orientation of the component is an orientation of a mirror.

12. The machine readable symbol reader of claim 1. wherein the plurality of illumination sources includes a plurality of light emitting diodes.

13. The machine readable symbol reader of claim 1 wherein the plurality of illumination sources includes a plurality of flash strobes.

14. The machine readable symbol reader of claim 1 e plurality of illumination sources includes a plurality of incandescent lamps.

15. The machine readable symbol reader of claim 1 wherein the plurality of illumination sources includes a plurality of fluorescent lamps.

16. The machine readable symbol reader of claim 1 wherein the plurality of illumination sources includes a plurality of halogen bulbs.

17. The machine readable symbol reader of claim 1 wherein the controller is configured to illuminate the plurality of illumination sources at desired times.

18. The machine readable symbol reader of claim 1 wherein the controller is configured to illuminate the plurality of illumination sources constantly.

19. The machine readable symbol reader of claim 3 wherein the coiled wire is rigidly mounted to the scan engine, and the magnet is rigidly mounted to the housing.

20. The machine readable symbol reader of claim 3 wherein the coiled wire is rigidly mounted to the housing, and the magnet is rigidly mounted to the scan engine.

* * * * *

UNITED STATES PATENT AND TRADEMARK OFFICE
CERTIFICATE OF CORRECTION

PATENT NO. : 10,380,392 B2
APPLICATION NO. : 15/182336
DATED : August 13, 2019
INVENTOR(S) : Giovanni Minafò et al.

Page 1 of 1

It is certified that error appears in the above-identified patent and that said Letters Patent is hereby corrected as shown below:

In the Claims

Column 19, Line 23, Claim 12:
"The machine readable symbol reader of Claim 1. wherein"
Should read:
--The machine readable symbol reader of Claim 1 wherein--.

Column 20, Line 4, Claim 14:
"The machine readable symbol reader of Claim 1 e"
Should read:
--The machine readable symbol reader of Claim 1 wherein the--.

Signed and Sealed this
Eighteenth Day of August, 2020

Andrei Iancu
*Director of the United States Patent and Trademark Office*